US012671761B2

(12) United States Patent
Telson et al.

(10) Patent No.: US 12,671,761 B2
(45) Date of Patent: Jun. 30, 2026

(54) CLOUD-BASED VOICE CALLING SERVICE, VIDEO CALLING SERVICE, AND OVER-THE-TOP SERVICES

(71) Applicant: Level 3 Communications, LLC, Denver, CO (US)

(72) Inventors: Tina Telson, Golden, CO (US); Alexander D. Griese, Denver, CO (US); Corey DeLizza, Boulder, CO (US); Jason Brougham, Denver, CO (US); Adam Uzelac, Rochester, NY (US)

(73) Assignee: Level 3 Communications, LLC, Denver, CO (US)

( * ) Notice: Subject to any disclaimer, the term of this patent is extended or adjusted under 35 U.S.C. 154(b) by 143 days.

(21) Appl. No.: 18/915,012

(22) Filed: Oct. 14, 2024

(65) Prior Publication Data

US 2025/0133163 A1     Apr. 24, 2025

Related U.S. Application Data

(60) Provisional application No. 63/592,762, filed on Oct. 24, 2023.

(51) Int. Cl.
*H04M 3/42*          (2006.01)
(52) U.S. Cl.
CPC .. *H04M 3/42365* (2013.01); *H04M 2203/158* (2013.01); *H04M 2203/2066* (2013.01)

(58) Field of Classification Search
CPC ....... H04M 3/42365; H04M 2203/158; H04M 2203/2066
USPC ............ 379/201.01, 201.02, 201.03, 201.05, 379/207.15, 207.02
See application file for complete search history.

(56) References Cited

U.S. PATENT DOCUMENTS

2012/0321052 A1* 12/2012 Morrill ................... H04L 45/28
379/32.01

* cited by examiner

*Primary Examiner* — Thjuan K Addy

(57) ABSTRACT

Novel tools and techniques are provided for implementing cloud-based voice calling service, video calling service, and/or over-the-top ("OTT") services. In various embodiments, with a unified communications and collaboration interconnection ("UCCI") interconnection established between separate hyperscalers or communication service providers that have separate administrative domains, Internet Protocol ("IP") based communications services may be instantiated between a first user device or a first telephone number (or call identifier ("ID")) via a first hyperscaler and a second user device or a second telephone number (or call ID) via a second hyperscaler, without touching or traversing the public switched telephone network ("PSTN"). By bypassing the PSTN, not only can cloud-based voice calling services be implemented or established over the UCCI, but cloud-based video calling services and OTT services may also be instantiated, with the OTT services being instantiated during either the cloud-based voice calling services or the cloud-based video calling services.

20 Claims, 9 Drawing Sheets

400

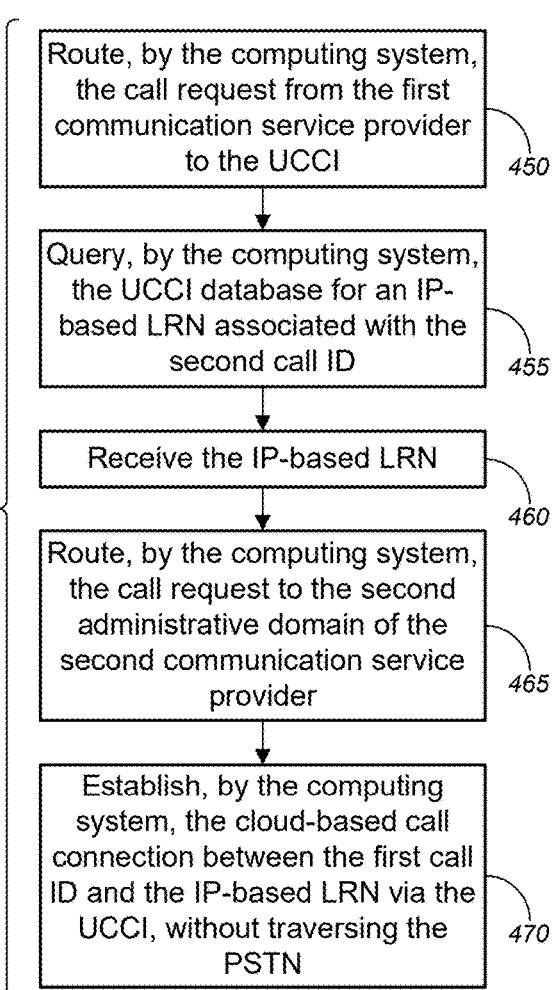

Establish, by the computing system, the cloud-based call connection between the first user device associated with the first call ID and the second user device associated with the second call ID via the UCCI, without traversing any node of the PSTN

425

Route, by the computing system, the call request from the first communication service provider to the UCCI

450

Query, by the computing system, the UCCI database for an IP-based LRN associated with the second call ID

455

Receive the IP-based LRN

460

Route, by the computing system, the call request to the second administrative domain of the second communication service provider

465

Establish, by the computing system, the cloud-based call connection between the first call ID and the IP-based LRN via the UCCI, without traversing the PSTN

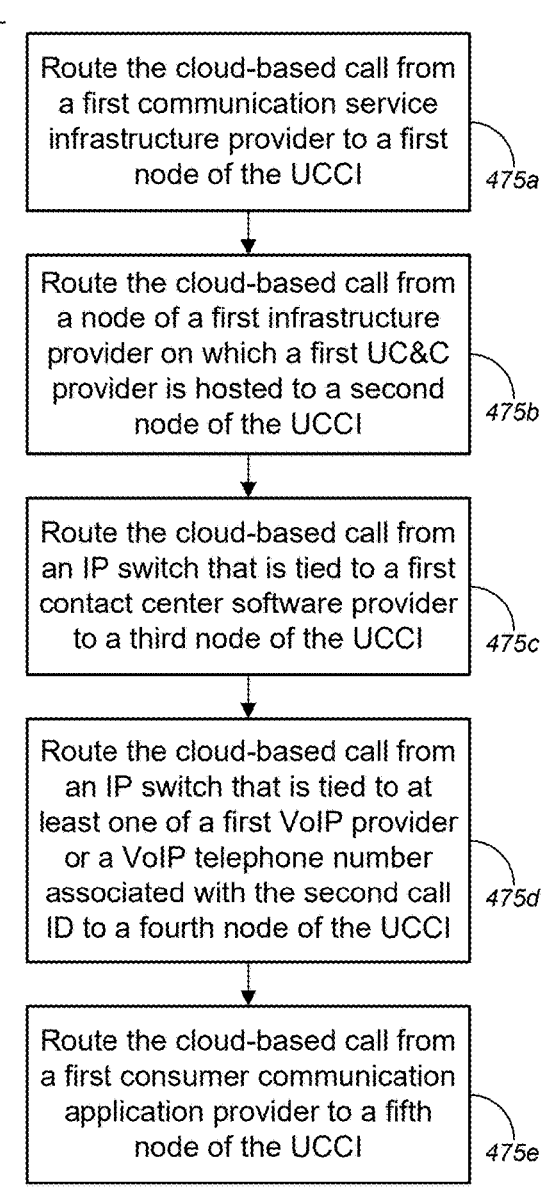

Establish, by the computing system, the cloud-based call connection between the first user device associated with the first call ID and the second user device associated with the second call ID via the UCCI, without traversing any node of the PSTN

425

Route a cloud-based call from the first communication service provider by performing one of:

475

Route the cloud-based call from a first communication service infrastructure provider to a first node of the UCCI 475a Route the cloud-based call from a node of a first infrastructure provider on which a first UC&C provider is hosted to a second node of the UCCI 475b Route the cloud-based call from an IP switch that is tied to a first contact center software provider to a third node of the UCCI 475c Route the cloud-based call from an IP switch that is tied to at least one of a first VoIP provider or a VoIP telephone number associated with the second call ID to a fourth node of the UCCI 475d Route the cloud-based call from a first consumer communication application provider to a fifth node of the UCCI 475e

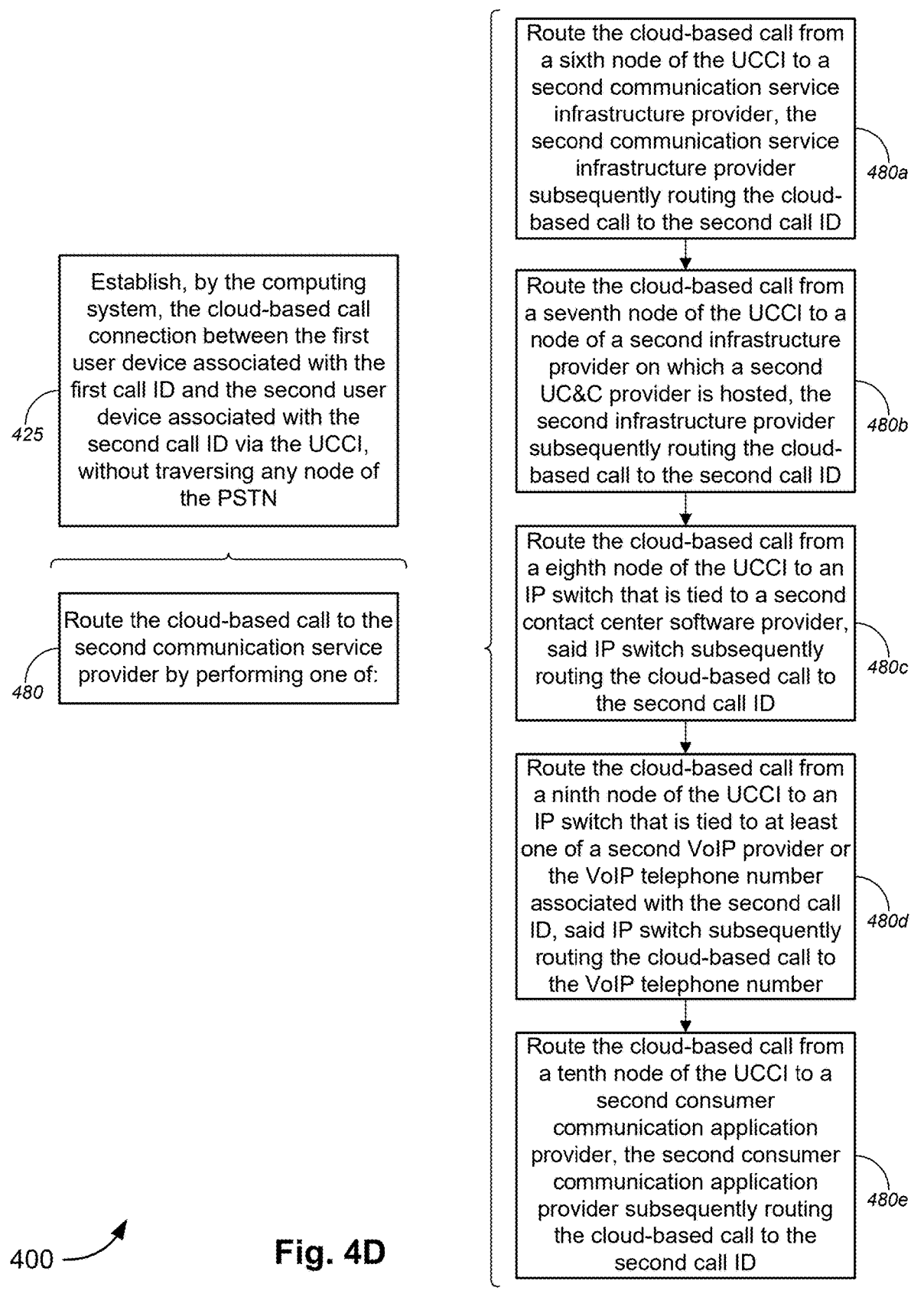

Establish, by the computing system, the cloud-based call connection between the first user device associated with the first call ID and the second user device associated with the second call ID via the UCCI, without traversing any node of the PSTN

425

Route the cloud-based call to the second communication service provider by performing one of:

480

Route the cloud-based call from a sixth node of the UCCI to a second communication service infrastructure provider, the second communication service infrastructure provider subsequently routing the cloud-based call to the second call ID 480a Route the cloud-based call from a seventh node of the UCCI to a node of a second infrastructure provider on which a second UC&C provider is hosted, the second infrastructure provider subsequently routing the cloud-based call to the second call ID 480b Route the cloud-based call from a eighth node of the UCCI to an IP switch that is tied to a second contact center software provider, said IP switch subsequently routing the cloud-based call to the second call ID 480c Route the cloud-based call from a ninth node of the UCCI to an IP switch that is tied to at least one of a second VoIP provider or the VoIP telephone number associated with the second call ID, said IP switch subsequently routing the cloud-based call to the VoIP telephone number 480d Route the cloud-based call from a tenth node of the UCCI to a second consumer communication application provider, the second consumer communication application provider subsequently routing the cloud-based call to the second call ID 480e 400     Fig. 4D

Figure 5:
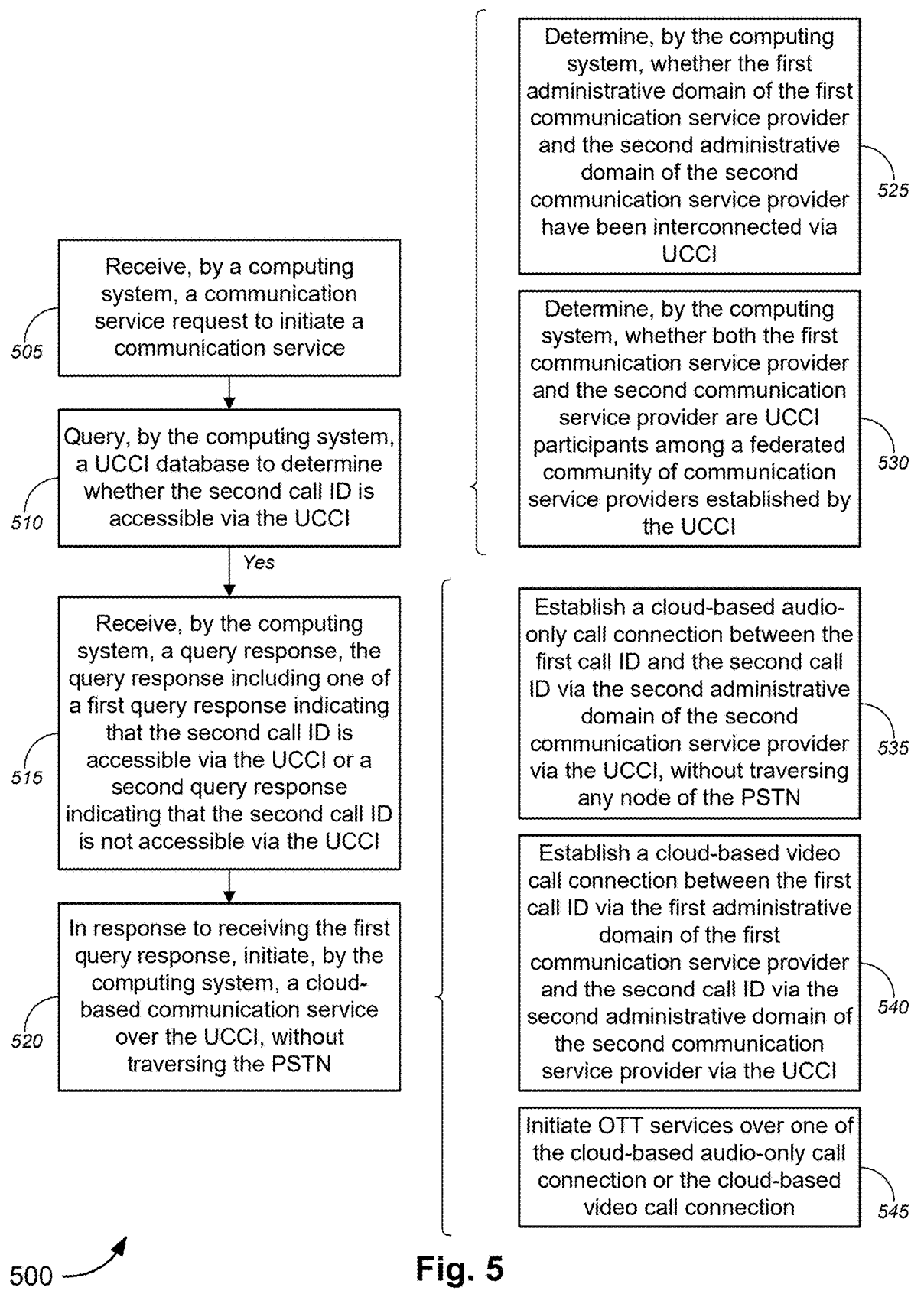

Receive, by a computing system, a communication service request to initiate a communication service

505

Query, by the computing system, a UCCI database to determine whether the second call ID is accessible via the UCCI

510

Yes

Receive, by the computing system, a query response, the query response including one of a first query response indicating that the second call ID is accessible via the UCCI or a second query response indicating that the second call ID is not accessible via the UCCI

515

In response to receiving the first query response, initiate, by the computing system, a cloud-based communication service over the UCCI, without traversing the PSTN

520

Determine, by the computing system, whether the first administrative domain of the first communication service provider and the second administrative domain of the second communication service provider have been interconnected via UCCI

525

Determine, by the computing system, whether both the first communication service provider and the second communication service provider are UCCI participants among a federated community of communication service providers established by the UCCI

530

Establish a cloud-based audio-only call connection between the first call ID and the second call ID via the second administrative domain of the second communication service provider via the UCCI, without traversing any node of the PSTN

535

Establish a cloud-based video call connection between the first call ID via the first administrative domain of the first communication service provider and the second call ID via the second administrative domain of the second communication service provider via the UCCI

540

Initiate OTT services over one of the cloud-based audio-only call connection or the cloud-based video call connection

CLOUD-BASED VOICE CALLING SERVICE, VIDEO CALLING SERVICE, AND OVER-THE-TOP SERVICES

CROSS-REFERENCE TO RELATED APPLICATIONS

This application claims the benefit of U.S. Provisional Application No. 63/592,762 filed Oct. 24, 2023, entitled "Cloud-Based Voice Calling Service, Video Calling Service, and Over-the-Top Services," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing calling services, and, more particularly, to methods, systems, and apparatuses for implementing cloud-based voice calling service, video calling service, and/or over-the-top ("OTT") services.

BACKGROUND

Today, voice calls typically touch or traverse the public switched telephone network ("PSTN"), even for calls that are initiated as Internet Protocol ("IP") calls or voice over IP ("VOIP") calls. This is especially true for calls from a calling telephone number in, or leveraging, an administrative domain of a first hyperscaler or communication service provider to a called telephone number in, or leveraging, an administrative domain of a second (separate) hyperscaler or communication service provider. Bridging such calls without touching or traversing the PSTN is challenging. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 4A-4D depict flow diagrams illustrating an example method for implementing cloud-based voice calling service, video calling service, and/or OTT services, in accordance with various embodiments.

FIG. 5 depicts flow diagrams illustrating another example method for implementing cloud-based voice calling service, video calling service, and/or OTT services, in accordance with various embodiments.

DETAILED DESCRIPTION OF CERTAIN EMBODIMENTS

Overview

Figure 1:
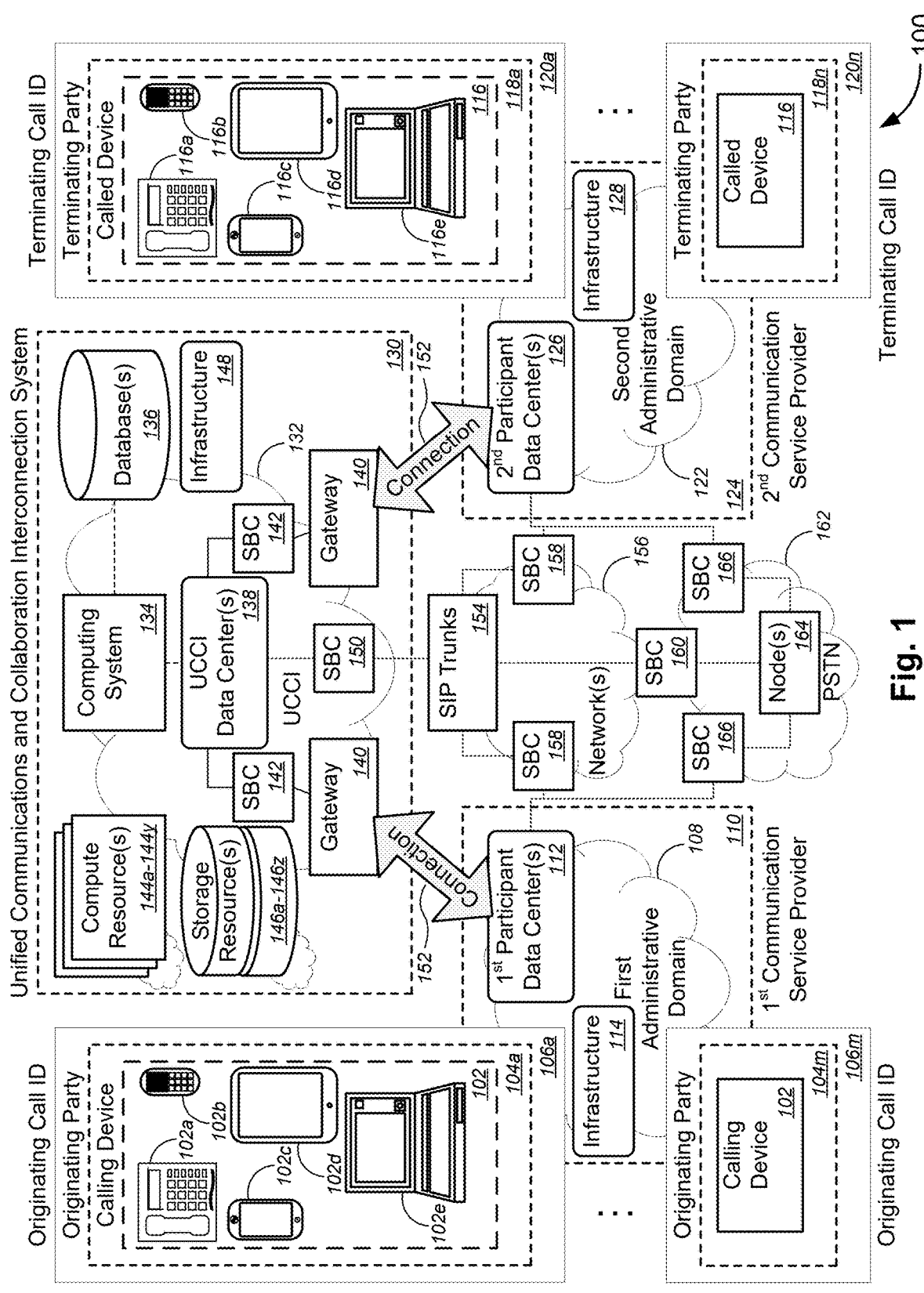
FIG. 1 depicts an example system for implementing cloud-based voice calling service, video calling service, and/or over-the-top ("OTT") services, in accordance with various embodiments.

Various embodiments provide tools and techniques for implementing calling services, and, more particularly, to methods, systems, and apparatuses for implementing cloud-based voice calling service, video calling service, and/or over-the-top ("OTT") services.

In various embodiments, a computing system receives a call request to establish a call connection between a first call identifier ("ID") and a second call ID. The first call ID is associated with a first user and is associated with a first communication service provider, while the second call ID is associated with a second user and is associated with a second communication service provider. A first administrative domain of the first communication service provider is separate from a second administrative domain of the second communication service provider. The computing system determines whether the first administrative domain of the first communication service provider and the second administrative domain of the second communication service provider have been interconnected via a unified communications and collaboration interconnection ("UCCI"), wherein the UCCI is a cloud-based interconnection. Based on a determination that the first administrative domain of the first communication service provider and the second administrative domain of the second communication service provider have been interconnected via the UCCI, the computing system queries a UCCI database to determine whether the second call ID is accessible via the UCCI. The computing system receives a query response, the query response including one of a first query response indicating that the second call ID is accessible via the UCCI or a second query response indicating that the second call ID is not accessible via the UCCI. In response to receiving the first query response indicating that the second call ID is accessible via the UCCI, the computing system establishes a cloud-based call connection between a first user device associated with the first call ID via the first administrative domain of the first communication service provider and a second user device associated with the second call ID via the second administrative domain of the second communication service provider via the UCCI, without traversing any node of a public switched telephone network ("PSTN").

The various use cases described herein are applicable to a wide range of users that have a common need for IP-based communication services. IP-based communications services provided by the UCCI or UCCI system can be established from either a Layer 2 or Layer 3 IP interface, and such flows can coexist on an IP network with best-effort traffic. The UCCI or UCCI system enables a federated community of communication services providers and hyperscalers. The various embodiments allow for any suitable design for UCCI or UCCI system architecture or protocols. The UCCI or UCCI system assist at least the following three types of primary users, as described in detail below with respect to FIG. 2: (1) Indirect Enterprise and Consumer IP-based Communications Services Users (see the "Federation Classes of Use Cases" below); (2) Direct Enterprise IP-based Communications Services Users (see the "Enterprise Classes of Use Cases" below); and (3) Direct Consumer IP-based Communications Services Users (see the "Consumer Classes of Use Cases" below). Herein (2) and (3) are underpinned by (1), which outlines the communication services providers that will be federated, thereby enabling IP-based communication services providers.

By bypassing the PSTN and establishing the call connection only over IP networks via the UCCI or UCCI system connecting two or more separate administrative domains, call termination costs are significantly reduced. Moreover, video calling services and OTT services may be instantiated over the UCCI or UCCI system connection, where the PSTN would have prevented such services due to such services not being supported by the PSTN.

These and other aspects of the cloud-based voice calling service, video calling service, and/or OTT services are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a method, including receiving, by a computing system, a call request to establish a call connection between a first call identifier ("ID") and a second call ID. The first call ID is associated with a first user and is associated with a first communication service provider, while the second call ID is associated with a second user and is associated with a second communication service provider. A first administrative domain of the first communication service provider is separate from a second administrative domain of the second communication service provider. The method further includes determining, by the computing system, whether the first administrative domain of the first communication service provider and the second administrative domain of the second communication service provider have been interconnected via a unified communications and collaboration interconnection ("UCCI"), wherein the UCCI is a cloud-based interconnection. The method also includes, based on a determination that the first administrative domain of the first communication service provider and the second administrative domain of the second communication service provider have been interconnected via the UCCI, querying, by the computing system, a UCCI database to determine whether the second call ID is accessible via the UCCI. The method further includes receiving, by the computing system, a query response, the query response including one of a first query response indicating that the second call ID is accessible via the UCCI or a second query response indicating that the second call ID is not accessible via the UCCI. In response to receiving the first query response indicating that the second call ID is accessible via the UCCI, establishing, by the computing system, a cloud-based call connection between a first user device associated with the first call ID via the first administrative domain of the first communication service provider and a second user device associated with the second call ID via the second administrative domain of the second communication service provider via the UCCI, without traversing any node of a public switched telephone network ("PSTN").

In examples, the first communication service provider operates or manages a first set of cloud-based data centers and the first administrative domain is hosted on the first set of cloud-based data centers. In some cases, the second communication service provider operates or manages a second set of cloud-based data centers and the second administrative domain is hosted on the second set of cloud-based data centers. The UCCI is operated or managed by a UCCI provider using a UCCI system. In some examples, the UCCI system includes at least one of one or more UCCI gateway devices, a plurality of optical connections between each set of cloud-based data center and the one or more UCCI gateway devices, or one or more UCCI session border controllers ("SBCs") each disposed at a UCCI data center among one or more UCCI data centers, and/or the like. In some instances, the UCCI system further includes at least one of an orchestrator, a plurality of compute resources, a plurality of data storage resources, one or more routers, one or more switches, or one or more firewalls, and/or the like.

In some examples, the UCCI establishes a federated community of communication service providers by interconnecting a plurality of administrative domains corresponding to a plurality of communication service providers, with each communication service provider among the plurality of communication service provider being a participant of the UCCI. In some instances, determining whether the second call ID is accessible via the UCCI includes determining whether the second communication service provider is a UCCI participant. In some cases, the UCCI is a layer three network interconnection that is established over layer two network connections of nodes within a corresponding administrative domain of each of the first communication service provider or the second communication service provider.

In some instances, the computing system is a computing system of the UCCI. In some cases, the cloud-based call connection includes one of an audio-only call connection or a video call connection, and/or the like. In examples, establishing the cloud-based call connection includes routing, by the computing system, the call request from the first communication service provider to the UCCI; querying, by the computing system, the UCCI database for an IP-based local routing number ("LRN") associated with the second call ID; and in response to receiving the IP-based LRN, routing, by the computing system, the call request to the second administrative domain of the second communication service provider, and establishing, by the computing system, the cloud-based call connection between the first call ID and the IP-based LRN via the UCCI, without traversing the PSTN.

In examples, the first communication service provider and the second communication service provider each includes at least one of a communication service infrastructure provider (or hyperscaler), a unified communications and collaboration ("UC&C") provider, a contact center software provider, a voice over Internet protocol ("VoIP") provider, or a consumer communication application provider, and/or the like. In some examples, establishing the cloud-based call connection includes routing a cloud-based call from the first communication service provider by performing one of: routing the cloud-based call from a first communication service infrastructure provider to a first node of the UCCI; routing the cloud-based call from a node of a first infrastructure provider on which a first UC&C provider is hosted to a second node of the UCCI; routing the cloud-based call from an IP switch that is tied to a first contact center software provider to a third node of the UCCI; routing the cloud-based call from an IP switch that is tied to at least one of a first VoIP provider or a VoIP telephone number associated with the first call ID to a fourth node of the UCCI; or routing the cloud-based call from a first consumer communication application provider to a fifth node of the UCCI; and/or the like.

In some cases, establishing the cloud-based call connection further includes routing the cloud-based call to the second communication service provider by performing one of: routing the cloud-based call from a sixth node of the UCCI to a second communication service infrastructure provider, the second communication service infrastructure provider subsequently routing the cloud-based call to the second call ID, wherein the second user associated with the second call ID includes one of an employee of the second communication service infrastructure provider, a customer of the second communication service infrastructure provider, or a user leveraging infrastructure of the second communication service infrastructure provider; routing the cloud-based call from a seventh node of the UCCI to a node of a second infrastructure provider on which a second UC&C provider is hosted, the second infrastructure provider subsequently routing the cloud-based call to the second call ID; routing the cloud-based call from a eighth node of the UCCI to an IP switch that is tied to a second contact center software provider, said IP switch subsequently routing the cloud-based call to the second call ID; routing the cloud-based call from a ninth node of the UCCI to an IP switch that is tied to at least one of a second VOIP provider or the VOIP telephone number associated with the second call ID, said IP switch subsequently routing the cloud-based call to the VoIP telephone number; or routing the cloud-based call from a tenth node of the UCCI to a second consumer communication application provider, the second consumer communication application provider subsequently routing the cloud-based call to the second call ID; and/or the like.

In some examples, establishing the cloud-based call connection includes establishing one of an audio-only call or a video call, and/or the like. In some instances, the method further includes receiving, by the computing system, a request for one or more over-the-top ("OTT") services; and, after establishing the cloud-based call connection, initiating, by the computing system, the requested one or more OTT services during the one of the audio-only call or the video call. In some cases, in response to receiving a query response indicating that the second call ID is not accessible via the UCCI, performing one of: for a voice call request, establishing a call connection between the first call ID via the first administrative domain of the first communication service provider and the second call ID via the second administrative domain of the second communication service provider via the UCCI and via at least one node of the PSTN; or for a video call request, returning an error message indicating that the video call cannot be established because the PSTN does not support video calls.

In another aspect, the technology relates to a system, including a computing system, including at least one first processor; and a first non-transitory computer readable medium communicatively coupled to the at least one first processor. The first non-transitory computer readable medium has stored thereon computer software including a first set of instructions that, when executed by the at least one first processor, causes the computing system to receive a call request to establish a call connection between a first call ID and a second call ID. The first call ID is associated with a first user and is associated with a first communication service provider. The second call ID is associated with a second user and is associated with a second communication service provider. A first administrative domain of the first communication service provider is separate from a second administrative domain of the second communication service provider. The first set of instructions, when executed by the at least one first processor, further causes the computing system to determine whether the first administrative domain of the first communication service provider and the second administrative domain of the second communication service provider have been interconnected via a UCCI, wherein the UCCI is a cloud-based interconnection. The first set of instructions, when executed by the at least one first processor, further causes the computing system to, based on a determination that the first administrative domain of the first communication service provider and the second administrative domain of the second communication service provider have been interconnected via the UCCI, query a UCCI database to determine whether the second call ID is accessible via the UCCI. The first set of instructions, when executed by the at least one first processor, further causes the computing system to receive a query response, the query response including one of a first query response indicating that the second call ID is accessible via the UCCI or a second query response indicating that the second call ID is not accessible via the UCCI. The first set of instructions, when executed by the at least one first processor, further causes the computing system to, in response to receiving the first query response indicating that the second call ID is accessible via the UCCI, establishing a cloud-based call connection between a first user device associated with the first call ID via the first administrative domain of the first communication service provider and a second user device associated with the second call ID via the second administrative domain of the second communication service provider via the UCCI, without traversing any node of a PSTN.

In examples, the computing system includes at least one of a system orchestrator, a server, a cloud computing system, or a distributed computing system, and/or the like. In some cases, the cloud-based call connection includes one of an audio-only call connection or a video call connection, and/or the like. Establishing the cloud-based call connection includes routing the call request from the first communication service provider to the UCCI; querying the UCCI database for an IP-based local routing number ("LRN") associated with the second call ID; and, in response to receiving the IP-based LRN, routing the call request to the second administrative domain of the second communication service provider, and establishing the cloud-based call connection between the first call ID and the IP-based LRN via the UCCI, without traversing the PSTN.

In some examples, establishing the cloud-based call connection includes routing a cloud-based call from the first communication service provider by performing one of: routing the cloud-based call from a first communication service infrastructure provider to a first node of the UCCI; routing the cloud-based call from a node of a first infrastructure provider on which a first UC&C provider is hosted to a second node of the UCCI; routing the cloud-based call from an IP switch that is tied to a first contact center software provider to a third node of the UCCI; routing the cloud-based call from an IP switch that is tied to at least one of a first VOIP provider or a VOIP telephone number associated with the first call ID to a fourth node of the UCCI; or routing the cloud-based call from a first consumer communication application provider to a fifth node of the UCCI; and/or the like.

In examples, establishing the cloud-based call connection further includes routing the cloud-based call to the second communication service provider by performing one of: routing the cloud-based call from the first node of the UCCI to a second communication service infrastructure provider, the second communication service infrastructure provider subsequently routing the cloud-based call to the second call ID, wherein the second user associated with the second call ID includes one of an employee of the second communication service infrastructure provider, a customer of the second communication service infrastructure provider, or a user leveraging infrastructure of the second communication service infrastructure provider; routing the cloud-based call from the second node of the UCCI to a node of a second infrastructure provider on which a second UC&C provider is hosted, the second infrastructure provider subsequently routing the cloud-based call to the second call ID; routing the cloud-based call from the third node of the UCCI to an IP switch that is tied to a second contact center software provider, said IP switch subsequently routing the cloud-based call to the second call ID; routing the cloud-based call from the fourth node of the UCCI to an IP switch that is tied to at least one of a second VOIP provider or the VoIP telephone number associated with the second call ID, said IP switch subsequently routing the cloud-based call to the VoIP telephone number; or routing the cloud-based call from the fifth node of the UCCI to a second consumer communication application provider, the second consumer communication application provider subsequently routing the cloud-based call to the second call ID; and/or the like.

In yet another aspect, the technology relates to a method, including receiving, by a computing system, a communication service request to initiate a communication service. In examples, the communication service includes one of an audio-only call, a video call, or an OTT service, and/or the like, during the audio-only call or the video call between a first call ID and a second call ID. The first call ID is associated with a first user and is associated with a first communication service provider. The second call ID is associated with a second user and is associated with a second communication service provider. A first administrative domain of the first communication service provider is separate from a second administrative domain of the second communication service provider. The method further includes querying, by the computing system, a unified communications and collaboration interconnection UCCI database to determine whether the second call ID is accessible via the UCCI; and receiving, by the computing system, a query response. In examples, the query response includes one of a first query response indicating that the second call ID is accessible via the UCCI or a second query response indicating that the second call ID is not accessible via the UCCI. In some examples, in response to receiving the first query response indicating that the second call ID is accessible via the UCCI, initiating, by the computing system, a cloud-based communication service over the UCCI, without traversing a PSTN.

In some examples, determining whether the second call ID is accessible via the UCCI includes at least one of: determining, by the computing system, whether the first administrative domain of the first communication service provider and the second administrative domain of the second communication service provider have been interconnected via UCCI; or determining, by the computing system, whether both the first communication service provider and the second communication service provider are UCCI participants among a federated community of communication service providers established by the UCCI.

In examples, initiating the cloud-based communication service over the UCCI, without traversing the PSTN, includes performing, by the computing system, a corresponding one of: establishing a cloud-based audio-only call connection between the first call ID via the first administrative domain of the first communication service provider and the second call ID via the second administrative domain of the second communication service provider via the UCCI, without traversing any node of the PSTN; establishing a cloud-based video call connection between the first call ID via the first administrative domain of the first communication service provider and the second call ID via the second administrative domain of the second communication service provider via the UCCI; or initiating OTT services over one of the cloud-based audio-only call connection or the cloud-based video call connection; and/or the like.

In some examples, the OTT services include at least one of a multiplayer screen-based video game playable during the one of the cloud-based audio-only call connection or the cloud-based video call connection, a multiplayer augmented reality ("AR") video game playable during the one of the cloud-based audio-only call connection or the cloud-based video call connection, a multiplayer virtual reality ("VR") video game playable during the one of the cloud-based audio-only call connection or the cloud-based video call connection, a multiplayer mixed reality ("MR") video game playable during the one of the cloud-based audio-only call connection or the cloud-based video call connection, screen-sharing during the one of the cloud-based audio-only call connection or the cloud-based video call connection, or live artificial intelligence ("AI")-generated multi-model content playable during the one of the cloud-based audio-only call connection or the cloud-based video call connection, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-6 illustrate some of the features of the method, system, and apparatus for implementing calling services, and, more particularly, to methods, systems, and apparatuses for implementing cloud-based voice calling service, video calling service, and/or OTT services, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 depicts an example system 100 for implementing cloud-based voice calling service, video calling service, and/or OTT services, in accordance with various embodiments.

In the non-limiting embodiment of FIG. 1, system 100 may include a calling device 102 that is associated with an originating party 104a among a plurality of originating parties 104a-104m (collectively, "originating parties 104," "calling parties 104," or "users 104," or the like) at corresponding originating addresses or originating call identifiers ("IDs") 106a-106m (collectively, "source addresses 106" or "call IDs 106" or the like) in an originating network(s) 108. In some instances, the calling device 102 (also referred to as a "user device 102" or the like) may include, but is not limited to, at least one of a telephone 102a, a mobile phone 102b, a smart phone 102c, a tablet computer 102d, or a laptop computer 102e, and/or the like. System 100 likewise may include a called device 116 that is associated with a terminating party 118a among a plurality of terminating parties 118a-118n (collectively, "terminating parties 118," "called parties 118," or "users 118," or the like) at corresponding terminating addresses or terminating call IDs 120a-120n (collectively, "terminating addresses 120" or "call IDs 120" or the like) in a terminating network(s) 122. In some instances, the called device 116 (also referred to as a "user device 116" or the like), similar to calling device 102, may include, but is not limited to, at least one of a telephone 116a, a mobile phone 116b, a smart phone 116c, a tablet computer 116d, or a laptop computer 116e, and/or the like. In examples, the call IDs 106 and 120 may each include one of a telephone number associated with a particular user, a unique user ID that is associated with the particular user for call connection purposes, or a unique network ID that is associated with the particular user for call connection purposes, and/or the like.

System 100 may further include a first administrative domain 108 that is associated with a first communication service provider 110. System 100 further includes a first participant data center(s) 112 and network infrastructure 114 that are each also associated with the first communication service provider 110. Similarly, system 100 may further include a second administrative domain 122 that is associated with a second communication service provider 124. System 100 further includes a second participant data center(s) 126 and network infrastructure 128 that are each also associated with the second communication service provider 124. An administrative domain, as used herein, refers to a network environment in which credentials enable facilitated authentication and authorization of clients within the network environment. The administrative domain may be implemented as a collection of hosts, routers, and/or interconnecting networks that are managed by a single administrative authority (in this case, communication service provider 110 or 124). In examples, the first communication service provider 110 and the second communication service provider 124 each includes at least one of a communication service infrastructure provider (also referred to as a "hyperscaler," "hyperscale company," or "hyperscale cloud service provider"), a unified communications and collaboration ("UC&C") provider, a contact center software provider, a voice over Internet protocol ("VoIP") provider, or a consumer communication application provider, and/or the like.

A hyperscaler, as used herein, refers to an entity or service provider that performs at least one of consulting, designing, developing, building, managing, and/or orchestrating software, data, and/or applications to rapidly and efficiently scale compute resources, storage resources, and/or network resources by adding or assigning (or re-assigning) resources such as servers and storage systems, or the like. Examples of hyperscalers include Amazon AWS®, Microsoft Azure®, Google GCP®, IBM®, Oracle®, Apple®, Meta®, etc. In some examples, where the first and second communication service providers 110 and 124 are hyperscalers, the first and second participant data centers 112 and 126 each includes at least one of servers, switches, routers, firewalls, storage systems, security systems, cables, and/or connectors, while the corresponding infrastructure 114 and 128 each includes one or more of the respective data centers 112 and 126 and their components, database management systems, machine learning systems, data analytics systems, virtualization systems (including hypervisors, virtual machines ("VMs"), containers, and/or the like), distributed computing systems, edge computing systems, load balancing systems, and/or the like.

A UC&C provider, as used herein, refers to an entity or service provider that provides or provisions, to users, a single interface that combines unified communications tools for real-time and non-real-time collaboration. In examples, the unified communications tools include a combination of two or more of a voice service platform, an Internet Protocol ("IP") telephony calling (or VoIP) platform, an email platform, an instant messaging or chat platform, a collaboration facilitator platform (including scheduling platform, project/user management platform, screen sharing platform, file sharing platform, online/offline presence monitoring platform, etc.), a web conferencing platform, an audio conferencing platform, or a video conferencing platform, and/or the like. In some instances, the unified communications tools include both cloud-based and premises-based systems. Examples of UC&C providers include Cisco Webex®, 8×8®, RingCentral®, Microsoft Teams®, Zoom®, etc. UC&C providers, in some cases, may utilize data centers and/or infrastructure of hyperscalers. That is, in some cases, the data centers and/or infrastructure of hyperscalers may host applications and/or platforms of the UC&C providers.

A contact center software provider, as used herein, refers to an entity or service provider that provides contact center software, which is a collection of applications that automate key contact center processes including at least one of routing inbound calls, routing outbound calls, collecting caller information, triggering prerecorded answers to frequently asked questions, initiating interactive voice response ("IVR") systems, transferring callers to other channels, routing inbound email messages, routing inbound chat message communications, implementing call monitoring and analytics, implementing message monitoring and analytics, and/or the like. Contact center software assists organizations in controlling costs, developing agents, monitoring and enhancing customer experience, maintaining compliance with laws and regulations, and/or the like. In examples, contact center software may be hosted on-site (sometimes referred to as "on-premises") or hosted by a vendor in the cloud in a software as a service ("SaaS") arrangement. For the latter case, in some examples, contact center software providers may utilize data centers and/or infrastructure of hyperscalers. That is, in some cases, the data centers and/or infrastructure of hyperscalers may host applications and/or platforms of the contact center software providers. In some examples, the data centers and/or infrastructure of hyperscalers may include one or more IP switches that are tied to a contact center software provider.

A VoIP provider, as used herein, refers to an entity or service provider that offers VOIP services directly to consumers or businesses. VOIP technology enables use of IP networks to perform telephony functions, such as making and receiving phone calls. In examples, VoIP providers may include cloud-based PBX providers. In some examples, VOIP providers may utilize data centers and/or infrastructure of hyperscalers. That is, in some cases, the data centers and/or infrastructure of hyperscalers may host applications and/or platforms of the VOIP providers. In some examples, the data centers and/or infrastructure of hyperscalers may include one or more IP switches that are tied to a VoIP provider.

A consumer communication application provider, as used herein, refers to an entity or service provider that enables live communication via communication applications including messaging applications, audio and video calling applications, and/or the like. Some of these communication applications enable multiple modes of live communication. In some examples, consumer communication application providers may utilize data centers and/or infrastructure of hyperscalers. That is, in some cases, the data centers and/or infrastructure of hyperscalers may host applications and/or platforms of the consumer communication application providers.

System 100 further includes a unified communications and collaboration interconnection ("UCCI") system 130. Interoperation between different administrative domains having different security repositories, different security software, and/or different security policies is notoriously difficult. For ad hoc interoperation or full interoperability between administrative domains, a federation must be built, and the UCCI system 130 as described herein enables building of such a federation. In examples, UCCI system 130 may include at least one of UCCI or UCCI network 132, computing system 134, database(s) 136, UCCI data center(s) 138 (similar to data centers 112 and/or 126), one or more gateway devices 140, one or more UCCI session border controllers ("SBCs") 142, one or more compute resources 144a-144y, one or more storage resources 146a-146z, infrastructure 148, or one or more IP SBCs 150, and/or the like. Herein, m, n, y, and z are non-negative integer numbers that may be either all the same as each other, all different from each other, or some combination of same and different (e.g., one set of two or more having the same values with the others having different values, a plurality of sets of two or more having the same value with the others having different values, etc.). In examples, the computing system 134 includes at least one of a system orchestrator, a server, a cloud computing system, or a distributed computing system, and/or the like. UCCI system 130 further includes high-speed network connections 152 between a gateway device 140 and a UCCI participant data center (e.g., first and second participant data centers 112 and 126). In some examples, the high-speed network connections 152 include optical fiber connections, free-space optical connections, and/or the like. By connecting the first and second administrative domains 108 and 122, voice calls (or audio-only calls) and/or video calls between a first user 104 via the first administrative domain 108 and a second user 118 via the first administrative domain 122, despite the first and second administrative domains having different security repositories, different security software, and/or different security policies. In examples, the first user 104 or the second user 118 may be either an employee of the corresponding communication service provider, a customer of the corresponding communication service provider, or a user leveraging infrastructure of the corresponding communication service provider, and/or the like. In this manner, voice calls and/or video calls may be established as cloud-based calls that bypass the public switched telephone network ("PSTN") 162, as further described in detail below with respect to FIGS. 2-5.

As cloud-based calls, OTT services or calling services may be initiated between the call participants during the voice calls and/or video calls (i.e., during live communications between the call participants). In examples, the OTT services include at least one of a multiplayer screen-based video game playable during the cloud-based call, a multiplayer augmented reality ("AR") video game playable during the cloud-based call, a multiplayer virtual reality ("VR") video game playable during the cloud-based call, a multiplayer mixed reality ("MR") video game playable during the cloud-based call, screensharing during the cloud-based call, or live artificial intelligence ("AI")-generated multi-model content playable during the cloud-based call, and/or the like.

In the case that a call connection cannot be established via UCCI via connections 152, e.g., due to the second communication service provider not being a UCCI participant and/or the terminating call ID 120 not being found in a UCCI database (e.g., database(s) 136, or the like), the UCCI system 130 may route the call through network(s) 156 and/or PSTN 162, via SBC 150, Session initiation protocol ("SIP") trunks 154, SBCs 158, 160, and/or 166, and/or node(s) 164. However, because the PSTN does not support video calls or non-voice services (such as the OTT services described above), video calls and OTT services cannot be established via the PSTN.

In some embodiments, networks 108, 122, 132, 156, and 162 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a PSTN; an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 108, 122, 132, 156, and 162 may include an access network of the service provider (e.g., an Internet service provider ("ISP")). In another embodiment, the networks 132, 156, and 162 may include a core network of the service provider and/or the Internet.

In operation, orchestrator or computing system 134 (collectively, "computing system") may perform methods for implementing cloud-based voice calling service, video calling service, and/or OTT services, as described in detail with respect to FIGS. 2-5. For example, sequence flows as described below with respect to FIGS. 2 and 3, and methods as described in detail with respect to FIGS. 4A-4D and 5 may be applied with respect to the operations of system 100 of FIG. 1.

Figure 2:
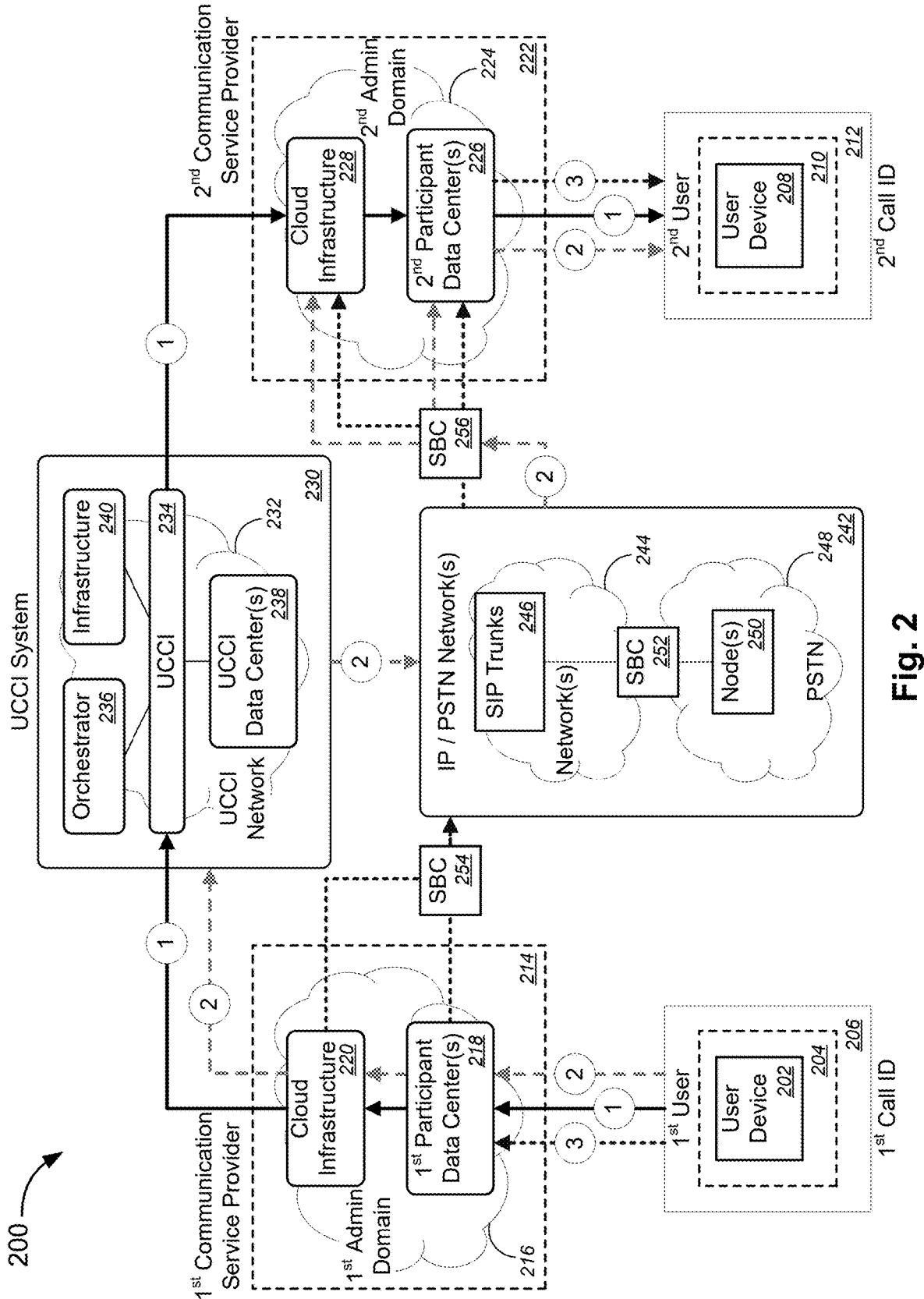
FIG. 2 depicts an example sequence flow for implementing cloud-based voice calling service, video calling service, and/or OTT services, in accordance with various embodiments.

FIG. 2 depicts an example sequence flow 200 for implementing cloud-based voice calling service, video calling service, and/or OTT services, in accordance with various embodiments. In some embodiments, user device 202, first user 204, first call ID 206, user device 208, second user 210, second call ID 212, first communication service provider 214, first administrative domain 216, first participant data center(s) 218, cloud infrastructure 220, second communication service provider 222, second administrative domain 224, second participant data center(s) 226, cloud infrastructure 228, UCCI system 230, UCCI network 232 or UCCI 234, orchestrator 236, UCCI data center(s) 238, infrastructure 240, network(s) 244, SIP trunks 246, PSTN 248, node(s) 250, SBC 252, and SBCs 254 and 256 of FIG. 2 may be similar, if not identical, to the user devices 102 and 102a-102e, originating parties 104a-140m, originating call IDs 106a-106m, user devices 116 and 116a-116e, terminating parties 118a-118n, terminating call IDs 120a-120n, first communication service provider 110, first administrative domain 108, first participant data center(s) 112, infrastructure 114, second communication service provider 124, second administrative domain 122, second participant data center(s) 126, infrastructure 128, UCCI system 130, UCCI network or UCCI 132, computing system 134, UCCI data center(s) 138, infrastructure 148, network(s) 156, SIP trunks 154, PSTN 162, node(s) 164, SBC 160, and SBCs 158 and 166, respectively, of system 100 of FIG. 1, and the description of these components of system 100 of FIG. 1 are similarly applicable to the corresponding components of FIG. 2. IP-based communications services provided by the UCCI or UCCI system can be established from either a Layer 2 or Layer 3 IP interface, and such flows can coexist on an IP network with best-effort traffic.

With reference to the non-limiting example of FIG. 2, first user device 202, which is associated with first user 204 and first call ID 206, may send a call request to first communication service provider 214, the call request including a second call ID 212 that is associated with second user device 208 and/or second user 210. First participant data center(s) 218, which is part of first administrative domain 216, receives the call request and queries UCCI system 230 via cloud infrastructure 220 (which, in some cases, may also be part of first administrative domain 216) to determine whether a call can be made to the second call ID via the UCCI system 230. Orchestrator 236 of UCCI system 230 may receive the call request and the query from the first communication service provider 214, and may query its database(s) (e.g., database(s) 136 of FIG. 1, or the like) to whether second communication service provider 222, with which the second call ID is associated, is a UCCI participant (like the first communication service provider 214).

In an example, based on a determination that the second communication service provider 222 is a UCCI participant, the orchestrator 236 establishes a cloud-based call connection between the cloud infrastructure 220 of first communication service provider 214 and cloud infrastructure 228 of second communication service provider 222 via UCCI 234, which is established via UCCI data center(s) 238 and/or infrastructure 240 over UCCI network 232. Once the cloud-based call connection has been established, orchestrator 236 routes the cloud-based call—which may include a voice call (or audio-only call) or a video call (or audio and video call)-via UCCI 234 from first participant data center(s) 218 of first communication service provider 214 via cloud infrastructure 220 to second participant data center(s) 226 of second communication service provider 222 via cloud infrastructure 228. Second communication service provider 222 then routes the cloud-based call to user device 208 from second participant data center(s) 226. The cloud-based call connection is depicted in FIG. 2 by the solid arrows denoted "1." As shown in FIG. 2, IP/PSTN network(s) 242 is bypassed. In examples, OTT services (as described above with respect to FIG. 1) may be initiated by first or second user 204 or 210 during the cloud-based call.

In another example, based on a determination that the second communication service provider 222 is not a UCCI participant, the orchestrator 236 establishes a call connection with IP/PSTN network(s) 242, which includes network(s) 244 and/or PSTN 248. Once the call connection has been established, orchestrator 236 routes the call from cloud infrastructure 220 through data center(s) 238 and/or infrastructure 240 of UCCI system 230 to IP/PSTN network(s) 242. In an example, SIP trunk 246 of network(s) 244 may route the call to second participant data center(s) 226 and/or cloud infrastructure 228 of second communication service provider 222 via SBC 256. Second communication service provider 222 then routes the call to user device 208 from second participant data center(s) 226 and/or cloud infrastructure 228. In another example, SIP trunk 246 of network(s) 244 may route the call to one or more nodes 250 of PSTN 248 via SBC 252, and the one or more nodes 250 may route the call to second participant data center(s) 226 and/or cloud infrastructure 228 of second communication service provider 222 via SBC 256. Second communication service provider 222 then routes the call to user device 208 from second participant data center(s) 226 and/or cloud infrastructure 228. Because the PSTN 248 (and, in some cases, network(s) 244 as well) does not support video calls or non-voice services (such as the OTT services described above), only voice calls (or audio-only calls) can be established via IP/PSTN network 242. The voice call connection is depicted in FIG. 2 by the long-dashed arrows denoted "2."

In yet another example, if neither the first nor second communication service providers 214 and 222 are UCCI participants and are not otherwise federated, then telephone calls (that is, voice calls or audio-only calls) would be routed between first participant data center(s) 218 and/or cloud infrastructure 220 of first communication service provider 214 via SBC 254 and second participant data center(s) 226 and/or cloud infrastructure 228 of second communication service provider 222 via SBC 256, via IP/PSTN network(s) 242. Such voice call connection is depicted in FIG. 2 by the short-dashed arrows denoted "3."

Both IP networks and the PSTN are used today to deliver communication services. In various classes of use cases, communication flows are changed when a federated community of hyperscalers and communication services providers is created. Unless enterprises or communication service providers are federated or exist within a single provider's network, voice calls that are made between telephone numbers largely touch or traverse the PSTN. A lack of peering agreements between and amongst hyperscalers and enterprise communication application service providers (e.g., Microsoft Teams® or 8×8®) make secure, cross-provider voice calling, video calling, and OTT services (e.g., AR video gaming, etc.) challenging. With the UCCI or UCCI system as described above, an array of communication services can be provided across communication services providers that have been federated. In examples, any communication service (e.g., audio, text, video, etc.) and OTT service between enterprises and communication services provider may be provisioned over the UCCI or UCCI system, by bypassing the PSTN.

Various classes of use cases for the UCCI or UCCI system include a federation class of use cases, an enterprise class of use cases, and a consumer class of use cases, as described below. The federation class of use cases includes a federation cloud calling class of use cases, a federation cloud video calling class of use cases, and a federation OTT services class of use cases. The federation cloud calling class of use cases provides for enabling cloud calling—i.e., IP-based voice calling—between telephone numbers. Telephone number to telephone number calls across two separate administrative domains, if not federated or on the same IP-based network, touch or traverse the PSTN. In examples, this class of calls would traverse IP networks (i.e., via UCCI or UCCI system), without touching traversing the PSTN. To implement this, not only do the individual communication services provider need to be federated, but their underlying infrastructure providers (e.g., hyperscalers) also need to be federated to enable this experience. With the UCCI or UCCI system as described above, the federated community of hyperscalers and communication services providers enable cross-provider voice calls to stay on IP networks and bypassing or avoiding the PSTN.

In an example, federating a first provider with a second provider—specifically, when it comes to voice calling—enables a telephone number to telephone number call between the first provider and the second provider to route via IP networks. In examples, a voice call placed from the first provider to the second provider traverses IP networks (i.e., via UCCI or UCCI system), without touching or traversing the PSTN. To implement this, not only do the second providers need to be federated, but their underlying infrastructure provider (should they exist) may need to be federated to enable the experience.

With the UCCI or UCCI system and federating the first and second providers, cloud calling can be enabled, and the PSTN is avoided. Suppose a telephone call is made from the first provider (regardless of if the telephone number user is a hyperscaler employee or hyperscaler customer and/or user) to a telephone number tied to the second provider. The call would route from the first provider to the UCCI or UCCI system. The UCCI or UCCI system would then query its database for the IP-based Local Routing Number ("LRN"). Querying for the LRN would replace querying the Local Number Portability ("LNP") for a number that exists in a block that has had a single number ported or querying the Local Exchange Routing Guide ("LERG") for blocks that have not had a number ported, where querying the LNP or the LERG leads to the call moving onto the PSTN. The UCCI or UCCI system would then route the call to the second provider.

In some examples, the first provider includes at least one of a hyperscaler, a UC&C provider, a contact center software provider, a VoIP provider, or a consumer communication application provider, and/or the like. In the case that the first provider is a hyperscaler, the call would route from the hyperscaler to the UCCI. In the case that the first provider is a UC&C provider, the call would route from a hyperscaler (or other infrastructure provider) that the UC&C provider is hosted on to the UCCI. In the case that the first provider is a contact center software provider, the call would route from an IP switch that is tied to the contact center software provider to the UCCI. In the case that the first provider is a VoIP provider, the call would route from an IP switch that is tied to the VoIP telephone number to the UCCI. In the case that the first provider is a consumer communication application provider, the call would route from the consumer communication application provider to the UCCI.

In some examples, the second provider includes at least one of a hyperscaler, a UC&C provider, a contact center software provider, a VoIP provider, or a consumer communication application provider, and/or the like. In the case that the second provider is a hyperscaler, the UCCI would route the call to the hyperscaler, which would then route the call appropriately-either to its employee, customer, or user leveraging its infrastructure. In the case that the second provider is a UC&C provider, the UCCI would route the call to a hyperscaler (or other infrastructure provider) that hosts the UC&C provider. The hyperscaler (or other infrastructure provider) hosting the UC&C provider would then route the call to the end-user. In the case that the second provider is a contact center software provider, the UCCI would route the call to an IP switch that is tied to the contact center software provider. The IP switch that is tied to the contact center software provider would then route the call to the end-user. In the case that the second provider is a VoIP provider, the UCCI would route the call to an IP switch that is tied to the VoIP telephone number. The IP switch that is tied to the VoIP provider would then route the call to the end-user. In the case that the second provider is a consumer communication application provider, the UCCI would route the call to the consumer communication application provider, which would then route the call to the end-user.

In examples, the federation cloud calling class of use cases includes cloud calling from hyperscaler to hyperscaler, from hyperscaler to UC&C provider, from hyperscaler to contact center software provider, from hyperscaler to VoIP provider, from hyperscaler to consumer communication application provider, from UC&C provider to hyperscaler, from UC&C provider to UC&C provider, from UC&C provider to contact center software provider, from UC&C provider to VoIP provider, from UC&C provider to consumer communication application provider, from contact center software provider to hyperscaler, from contact center software provider to UC&C provider, from contact center software provider to contact center software provider, from contact center software provider to VoIP provider, from contact center software provider to consumer communication application provider, from VoIP provider to hyperscaler, from VoIP provider to UC&C provider, from VoIP provider to contact center software provider, from VoIP provider to VoIP provider, from VoIP provider to consumer communication application provider, from consumer communication application provider to hyperscaler, from consumer communication application provider to UC&C provider, from consumer communication application provider to contact center software provider, from consumer communication application provider to VoIP provider, and from consumer communication application provider to consumer communication application provider.

The federation cloud video calling class of use cases provides for enabling cloud video calling—i.e., IP-based video calling—between telephone numbers. Telephone number to telephone number calls across two separate administrative domains, if not federated or on the same IP-based network, touch or traverse the PSTN. The PSTN, however, does not support video calling. In examples, this class of calls would traverse IP networks (i.e., via UCCI or UCCI system), without traversing the PSTN. To implement this, not only do the individual communication services provider need to be federated, but their underlying infrastructure providers (e.g., hyperscalers) also need to be federated to enable this experience. With the UCCI or UCCI system as described above, the federated community of hyperscalers and communication services providers enable cross-provider video calls to be established using telephone numbers.

In examples, federating a first provider with a second provider-specifically, when it comes to video calling—enables a telephone number to telephone number video call between the first provider and the second provider to route via IP networks. In examples, a video call placed from the first provider to the second provider traverses IP networks (i.e., via UCCI or UCCI system), without touching or traversing the PSTN. To implement this, not only do the second providers need to be federated, but their underlying infrastructure provider (should they exist) may need to be federated to enable the experience.

With the UCCI or UCCI system and federating the first and second providers, cloud video calling can be enabled, as the PSTN is avoided. Suppose a telephone call is made from the first provider (regardless of if the telephone number user is a hyperscaler employee or hyperscaler customer and/or user) to a telephone number tied to the second provider. The call would route from the first provider to the UCCI or UCCI system. The UCCI or UCCI system would then query its database for the IP-based LRN, similar to the federation cloud calling class of use cases described above. The UCCI or UCCI system would then route the call to the second provider.

In some examples, the first provider includes at least one of a hyperscaler, a UC&C provider, a contact center software provider, or a consumer communication application provider, and/or the like. In the case that the first provider is a hyperscaler, the video call would route from the hyperscaler to the UCCI or UCCI system. In the case that the first provider is a UC&C provider, the video call would route from a hyperscaler (or other infrastructure provider) that the UC&C provider is hosted on to the UCCI or UCCI system. In the case that the first provider is a contact center software provider, the video call would route from an IP switch that is tied to the contact center software provider to the UCCI or UCCI system. In the case that the first provider is a consumer communication application provider, the video call would route from the consumer communication application provider to the UCCI or UCCI system.

In some examples, the second provider includes at least one of a hyperscaler, a UC&C provider, a contact center software provider, or a consumer communication application provider, and/or the like. In the case that the second provider is a hyperscaler, the UCCI or UCCI system would route the video call to the hyperscaler, which would then route the video call appropriately—either to its employee, customer, or user leveraging its infrastructure. In the case that the second provider is a UC&C provider, the UCCI or UCCI system would route the video call to a hyperscaler (or other infrastructure provider) that hosts the UC&C provider. The hyperscaler (or other infrastructure provider) that hosts the UC&C provider would then route the video call to the end-user. In the case that the second provider is a contact center software provider, the UCCI or UCCI system would route the video call to an IP switch that is tied to the contact center software provider. The IP switch that is tied to the contact center software provider would then route the video call to the end-user. In the case that the second provider is a consumer communication application provider, the UCCI or UCCI system would route the video call to the consumer communication application provider, which would then route the video call to the end-user.

In examples, the federation cloud video calling class of use cases includes cloud video calling from hyperscaler to hyperscaler, from hyperscaler to UC&C provider, from hyperscaler to contact center software provider, from hyperscaler to consumer communication application provider, from UC&C provider to hyperscaler, from UC&C provider to UC&C provider, from UC&C provider to contact center software provider, from UC&C provider to consumer communication application provider, from contact center software provider to hyperscaler, from contact center software provider to UC&C provider, from contact center software provider to contact center software provider, from contact center software provider to consumer communication application provider, from consumer communication application provider to hyperscaler, from consumer communication application provider to UC&C provider, from consumer communication application provider to contact center software provider, and from consumer communication application provider to consumer communication application provider.

The federation OTT services class of use cases provides for enabling OTT services—e.g., multiplayer AR video gaming during audio-only or video call, screensharing during audio-only or video call, or live AI-generated multi-model content (e.g., contemporaneously generating subtitles as a movie is playing) during audio-only or video call-between telephone numbers. Telephone number to telephone number calls across two separate administrative domains, if not federated or on the same IP-based network, touch or traverse the PSTN. The PSTN, however, does not support video calling or OTT services. In examples, this class of calls would traverse IP networks (i.e., via UCCI or UCCI system), without traversing the PSTN. To implement this, not only do the individual communication services provider need to be federated, but their underlying infrastructure providers (e.g., hyperscalers) also need to be federated to enable this experience. With the UCCI or UCCI system as described above, the federated community of hyperscalers and communication services providers enable cross-provider video calls to be established using telephone numbers, while also enabling OTT services to be initiated during the video calls.

In some examples, federating a first provider with a second provider-specifically, when it comes to voice or video calling—enables a telephone number to telephone number video call between the first provider and the second provider to route via IP networks. In examples, a voice or video call placed from the first provider to the second provider traverses IP networks, without traversing the PSTN. For this to happen, not only do the second providers need to be federated, but their underlying infrastructure provider (should they exist) must be federated to enable the experience.

With the UCCI or UCCI system and federating the first and second providers, cloud calling or cloud video calling can be enabled, as the PSTN is avoided. Suppose a telephone call is made from the first provider (regardless of if the telephone number user is a hyperscaler employee or hyperscaler customer and/or user) to a telephone number tied to the second provider. The call would route from the first provider to the UCCI or UCCI system. The UCCI or UCCI system would then query its database for the IP-based LRN, similar to the federation cloud calling class of use cases described above. The UCCI or UCCI system would then route the call to the second provider. Once the connection is established, OTT services may then be enabled.

In some examples, the first provider includes at least one of a hyperscaler, a UC&C provider, a contact center software provider, a VoIP provider, or a consumer communication application provider, and/or the like. In the case that the first provider is a hyperscaler, the video call would route from the hyperscaler to the UCCI. In the case that the first provider is a UC&C provider, the video call would route from a hyperscaler (or other infrastructure provider) that the UC&C provider is hosted on to the UCCI. In the case that the first provider is a contact center software provider, the video call would route from an IP switch that is tied to the contact center software provider to the UCCI. In the case that the first provider is a consumer communication application provider, the video call would route from the consumer communication application provider to the UCCI.

In some examples, the second provider includes at least one of a hyperscaler, a UC&C provider, a contact center software provider, a VoIP provider, or a consumer communication application provider, and/or the like. In the case that the second provider is a hyperscaler, the UCCI would route the video call to the hyperscaler, which would then route the video call appropriately-either to its employee, customer, or user leveraging its infrastructure. In the case that the second provider is a UC&C provider, the UCCI would route the video call to a hyperscaler (or other infrastructure provider) that hosts the UC&C provider. The hyperscaler (or other infrastructure provider) that hosts the UC&C provider would then route the video call to the end-user. In the case that the second provider is a contact center software provider, the UCCI would route the video call to an IP switch that is tied to the contact center software provider. The IP switch that is tied to the contact center software provider would then route the video call to the end-user. In the case that the second provider is a consumer communication application provider, the UCCI would route the video call to the consumer communication application provider, which would then route the video call to the end-user.

In examples, the federation OTT services class of use cases includes cloud calling or cloud video calling from hyperscaler to hyperscaler, from hyperscaler to UC&C provider, from hyperscaler to contact center software provider, from hyperscaler to consumer communication application provider, from UC&C provider to hyperscaler, from UC&C provider to UC&C provider, from UC&C provider to contact center software provider, from UC&C provider to consumer communication application provider, from contact center software provider to hyperscaler, from contact center software provider to UC&C provider, from contact center software provider to contact center software provider, from contact center software provider to consumer communication application provider, from consumer communication application provider to hyperscaler, from consumer communication application provider to UC&C provider, from consumer communication application provider to contact center software provider, and from consumer communication application provider to consumer communication application provider.

The enterprise class of use cases includes an enterprise cloud calling class of use cases, an enterprise cloud video calling class of use cases, and an enterprise OTT services class of use cases. The enterprise cloud calling class of use cases encompasses enterprise-to-enterprise communications that are enabled by the UCCI or UCCI system. This selection of use cases is underpinned by the federation class of use cases as described in detail above. The enterprise cloud calling class of use cases provides for enabling cloud calling—i.e., IP-based voice calling—between IP-based enterprise telephone numbers. Enterprise telephone number to enterprise telephone number calls across two separate administrative domains, if not federated or on the same IP-based network, touch or traverse the PSTN. In examples, this class of calls would traverse IP networks (i.e., via UCCI or UCCI system), without traversing the PSTN. With the UCCI or UCCI system as described above, the federated community of hyperscalers and communication services providers enable cross-provider calls to stay on IP networks, thereby bypassing or avoiding the PSTN.

Today, calls from a first provider to a second provider often traverse the PSTN. When an outbound call is placed from the first provider to a telephone number in a separate administrative domain that is associated with the second provider if the enterprises (across separate administrative domains) that own the telephone numbers are not federated, the routing engine will search for where the number resides. Should the number exist in a block that has had a single number ported the LNP is queried. For blocks that have not had a number ported, the LERG is queried. The LNP or LERG identifies the carrier LRN then routes the call to the carrier switch which then routes through the carrier's SBC that routes the call back onto the IP network and onto the first provider.

In examples, calls from the first provider to the second provider are routed by IP networks, while actively bypassing or avoiding the PSTN. With the UCCI or UCCI system, any number that is loaded into the UCCI database would remain on IP networks, thus avoiding the PSTN. In some examples, a user of the first provider places a call to a telephone number associated with an enterprise that uses software of the second provider. The call would route from the second provider to the UCCI or UCCI system. The UCCI or UCCI system would then query its database for the IP-based LRN. The UCCI or UCCI system would then route the call to the second provider and then ultimately to the end-user.

In some examples, the first provider includes at least one of a UC&C provider, a contact center software provider, or a VoIP provider, and/or the like. In the case that the first provider is a UC&C provider, the call would route from a hyperscaler (or other infrastructure provider) that the UC&C provider is hosted on to the UCCI or UCCI system. In the case that the first provider is a contact center software provider, the call would route from an IP-based switch that hosts a telephone number associated with or tied to the contact center software provider to the UCCI or UCCI system. In the case that the first provider is a VoIP provider, the call would route from an IP-based switch that hosts the VoIP telephone number or is associated with or tied to the VoIP telephone number to the UCCI or UCCI system.

In some examples, the second provider includes at least one of a UC&C provider, a contact center software provider, or a VoIP provider, and/or the like. In the case that the second provider is a UC&C provider, the UCCI or UCCI system would route the call to a hyperscaler (or other infrastructure provider) that hosts software of the UC&C provider. The hyperscaler (or other infrastructure provider) that hosts the UC&C provider would then route the call to the end-user. In the case that the second provider is a contact center software provider, the UCCI or UCCI system would route the call to an IP-based switch that hosts the telephone number associated with or is tied to the contact center software provider. The IP-based switch that is tied to the contact center software provider would then route the call to the end-user. In the case that the second provider is a VoIP provider, the UCCI or UCCI system would route the call to an IP-based switch that hosts the VoIP telephone number or is associated with or tied to the VoIP telephone number. The IP-based switch that is tied to the VoIP provider would then route the call to the end-user.

In examples, the enterprise cloud calling class of use cases includes cloud calling from UC&C provider to UC&C provider, from UC&C provider to contact center software provider, from UC&C provider to VoIP provider, from contact center software provider to UC&C provider, from contact center software provider to contact center software provider, from contact center software provider to VoIP provider, from VoIP provider to UC&C provider, from VoIP provider to contact center software provider, and from VoIP provider to VoIP provider.

The enterprise cloud video calling class of use cases provides for enabling cloud video calling—i.e., IP-based video calling—between IP-based enterprise telephone numbers. Unless providers and their customers (across separate administrative domains) are federated with each other, video calls across providers are not possible. With the UCCI or UCCI system, the federated community of hyperscalers and communication services providers enable video calls across any and all video communication service provider that are federated, regardless of the provider or administrative domain, based on the IP-based telephone numbers.

Unless the first providers and their enterprise customers (across separate administrative domains) as well as the second providers and their enterprise customers (across separate administrative domains) are federated with each other, video calls from the first provider to the second provider are not possible. That is, should a user make a call from the first provider to the second provider, unless the first providers and their enterprise customers as well as the second providers and their enterprise customers are federated, the call would cross over to the PSTN, thereby making such video calls impossible.

In examples, IP-based telephone numbers tied to the first provider and the second provider should be able to video call each other, regardless of the first provider or the second provider that a user of the enterprise telephone number uses, by using the UCCI or UCCI system. With the UCCI or UCCI system, the federated community of hyperscalers and communication services providers enable video calls from the first provider to the second provider as it would federate the first providers and their enterprise customers (across separate administrative domains) with the second providers and their enterprise customers (across separate administrative domains). In this scenario, a user of the first provider would use a telephone number to try and place a video call. The video call would originate on the hyperscaler that software of the first provider is hosted on. The call would then route from the first provider to the UCCI or UCCI system. The UCCI or UCCI system would then query its database for the IP-based LRN. The UCCI or UCCI system would then route the video call to the second provider, and then ultimately to the user.

In some examples, the first provider includes at least one of a UC&C provider or a contact center software provider, and/or the like. In the case that the first provider is a UC&C provider, the video call would route from a hyperscaler (or other infrastructure provider) that the UC&C provider is hosted on to the UCCI or UCCI system. In the case that the first provider is a contact center software provider, the video call would route from an IP-based switch that hosts a telephone number associated with or tied to the contact center software provider to the UCCI or UCCI system.

In some examples, the second provider includes at least one of a UC&C provider or a contact center software provider, and/or the like. In the case that the second provider is a UC&C provider, the UCCI or UCCI system would route the video call to a hyperscaler (or other infrastructure provider) that hosts software of the UC&C provider. The hyperscaler (or other infrastructure provider) that hosts the UC&C provider would then route the video call to the end-user. In the case that the second provider is a contact center software provider, the UCCI or UCCI system would route the video call to an IP-based switch that hosts the telephone number associated with or is tied to the contact center software provider. The IP-based switch that is tied to the contact center software provider would then route the call to the end-user.

In examples, the enterprise cloud video calling class of use cases includes cloud video calling from UC&C provider to UC&C provider, from UC&C provider to contact center software provider, from contact center software provider to UC&C provider, and from contact center software provider to contact center software provider.

The enterprise OTT services class of use cases provides for enabling OTT services between IP-based enterprise telephone numbers. Unless providers and their customers (across separate administrative domains) are federated with each other, OTT services across providers are not possible. In examples, with the UCCI or UCCI system, the federated community of hyperscalers and communication services providers enable OTT services.

Unless first providers and their enterprise customers (across separate administrative domains) as well as second providers and their enterprise customers (across separate administrative domains) are federated with each other, OTT services between the first provider and the second provider are not possible. That is, should a user make a call from the first provider to the second provider, unless the first providers and their enterprise customers as well as the second providers and their enterprise customers are federated, the call will cross over to the PSTN, thereby making such OTT services impossible.

In examples, IP-based telephone numbers tied to the first provider and the second provider should be able to offer OTT services, regardless of the first provider or the second provider that a user of the enterprise telephone number uses, by using the UCCI or UCCI system. With the UCCI or UCCI system, the federated community of hyperscalers and communication services providers enable live interactions between the first provider and the second provider as it would federate the first providers and their enterprise customers (across separate administrative domains) with the second providers and their enterprise customers (across separate administrative domains). In this scenario, a telephone call or a video call may be initiated as described above with respect to cloud calling or cloud video calling. Once the call has been initiated, users on either end of the call may instantiate OTT services due to the federated experience enabled by the UCCI or UCCI system.

In some examples, the first provider includes at least one of a UC&C provider or a contact center software provider, and/or the like. Whether the first provider is a UC&C provider or a contact center software provider, the OTT services may include live collaboration tools associated with the video or audio-only call. In some examples, the second provider includes at least one of a UC&C provider or a contact center software provider, and/or the like. Whether the second provider is a UC&C provider or a contact center software provider, the OTT services may include live collaboration tools associated with the video or audio-only call. In examples, the enterprise OTT services class of use cases includes cloud calling or cloud video calling from UC&C provider to UC&C provider, from UC&C provider to contact center software provider, from contact center software provider to UC&C provider, and from contact center software provider to contact center software provider.

The consumer class of use cases includes a consumer cloud calling class of use cases, a consumer cloud video calling class of use cases, and a consumer OTT services class of use cases. The consumer cloud calling class of use cases encompasses consumer-to-consumer as well as consumer-to-enterprise and enterprise-to-consumer communications that are enabled by the UCCI or UCCI system. This selection of use cases is underpinned by the federation class of use cases as described in detail above. The consumer cloud calling class of use cases provides for enabling cloud calling—i.e., IP-based voice calling—between IP-based consumer telephone numbers, as well as consumer and enterprise telephone numbers. Consumer telephone number to consumer telephone number, consumer to enterprise telephone number, or enterprise to consumer telephone number calling across two separate administrative domains, if not federated or on the same IP-based network, touch or traverse the PSTN. In examples, this class of calls would traverse IP networks, without traversing the PSTN. With the UCCI or UCCI system as described above, the federated community of hyperscalers and communication services providers enable cross-provider calls to stay on IP networks, thereby bypassing or avoiding the PSTN.

Today, calls from a first provider to a second provider often traverse the PSTN. When an outbound call is placed from the first provider to a telephone number in a separate administrative domain that is associated with the second provider if the provider of the telephone number to the consumer (i.e., the first provider) and the second provider (across separate administrative domains) are not federated over IP, the routing engine may leverage the PSTN to find where the telephone number resides. Should the number exist in a block that has had a single number ported, the LNP is queried. For blocks that have not had a number ported, the LERG is queried. The LNP or LERG identifies the carrier LRN then routes the call to the appropriate carrier which then routes the call to the receiving customer.

In examples, calls from the first provider to the second provider are routed by IP networks, while actively bypassing or avoiding the PSTN. With the UCCI or UCCI system, any number that is loaded into the UCCI database would remain on IP networks, thus avoiding the PSTN. In examples, a user of the first provider with a first telephone number places a call to a second telephone number associated with the second provider. The call would route from the first provider to the UCCI or UCCI system. The UCCI or UCCI system would then query its database for the IP-based LRN. The UCCI or UCCI system would then route the call to the second provider, then ultimately to the second telephone number.

In some examples, the first provider includes at least one of a consumer communication application provider, a UC&C provider, a contact center software provider, or a VoIP provider, and/or the like. In the case that the first provider is a consumer communication application provider, the call would route from the first provider to the UCCI or UCCI system. In the case that the first provider is a UC&C provider, the call would route from a hyperscaler (or other infrastructure provider) that the UC&C provider is hosted on to the UCCI or UCCI system. In the case that the first provider is a contact center software provider, the call would route from an IP-based switch that hosts a telephone number associated with or tied to the contact center software provider to the UCCI or UCCI system. In the case that the first provider is a VoIP provider, the call would route from an IP-based switch that hosts the VoIP telephone number or is associated with or tied to the VoIP telephone number to the UCCI or UCCI system.

In some examples, the second provider includes at least one of a consumer communication application provider, a UC&C provider, a contact center software provider, or a VoIP provider, and/or the like. In the case that the second provider is a consumer communication application provider, the UCCI or UCCI system would route the call to the consumer communication application provider, which would then route the call to the end-user. In the case that the second provider is a UC&C provider, the UCCI or UCCI system would route the call to a hyperscaler (or other infrastructure provider) that hosts software of the UC&C provider. The hyperscaler (or other infrastructure provider) that hosts the UC&C provider would then route the call to the end-user. In the case that the second provider is a contact center software provider, the UCCI or UCCI system would route the call to an IP-based switch that hosts the telephone number associated with or is tied to the contact center software provider. The IP-based switch that is tied to the contact center software provider would then route the call to the end-user. In the case that the second provider is a VoIP provider, the UCCI or UCCI system would route the call to an IP-based switch that hosts the VoIP telephone number or is associated with or tied to the VoIP telephone number. The IP-based switch that is tied to the VoIP provider would then route the call to the end-user.

In examples, the consumer cloud calling class of use cases includes cloud calling from UC&C provider to consumer communication application provider, from contact center software provider to consumer communication application provider, from VOIP provider to consumer communication application provider, from consumer communication application provider to UC&C provider, from consumer communication application provider to contact center software provider, from consumer communication application provider to VoIP provider, and from consumer communication application provider to consumer communication application provider.

The consumer cloud video calling class of use cases provides for enabling cloud video calling—i.e., IP-based video calling—between IP-based consumer telephone numbers, as well as consumer and enterprise telephone numbers. Consumer telephone number to consumer telephone number, consumer telephone number to enterprise telephone number, or enterprise telephone number to consumer telephone number calling across two separate administrative domains, if not federated or on the same IP-based network, would traverse the PSTN. The PSTN, however, does not support video calling. In examples, with the UCCI or UCCI system, the federated community of hyperscalers and communication services providers enable cross-provider calls to stay on IP networks, thereby bypassing or avoiding the PSTN and enabling cross-provider video calling using telephone numbers.

Calls from a first provider to a second provider often traverse the PSTN. When an outbound call is placed from the first provider to a telephone number in a separate administrative domain that is associated with the second provider if the provider of the telephone number to the consumer (i.e., the first provider) and the second provider (across separate administrative domains) are not federated over IP, the routing engine may leverage the PSTN to find where the telephone number resides. Should the number exist in a block that has had a single number ported, the LNP is queried. For blocks that have not had a number ported, the LERG is queried. The LNP or LERG identifies the carrier LRN then routes the call to the appropriate carrier which then routes the call to the receiving customer. Should this occur, video calls cannot be made as the PSTN does not support video calling.

In examples, video calls from the first provider to the second provider are routed by IP networks, while actively bypassing or avoiding the PSTN. With the UCCI or UCCI system, any number that is loaded into the UCCI database would remain on IP networks, thus avoiding the PSTN. In some examples, a user of the first provider with a first telephone number places a video call to a second telephone number associated with the second provider. The video call would route from the first provider to the UCCI or UCCI system. The UCCI or UCCI system would then query its database for the IP-based LRN. The UCCI or UCCI system would then route the video call to the second provider, then ultimately to the second telephone number.

In some examples, the first provider includes at least one of a consumer communication application provider, a UC&C provider, or a contact center software provider, and/or the like. In the case that the first provider is a consumer communication application provider, the video call would route from the first provider to the UCCI or UCCI system. In the case that the first provider is a UC&C provider, the video call would route from a hyperscaler (or other infrastructure provider) that the UC&C provider is hosted on to the UCCI or UCCI system. In the case that the first provider is a contact center software provider, the video call would route from an IP-based switch that hosts a telephone number associated with or tied to the contact center software provider to the UCCI or UCCI system.

In some examples, the second provider includes at least one of a consumer communication application provider, a UC&C provider, or a contact center software provider, and/or the like. In the case that the second provider is a consumer communication application provider, the UCCI or UCCI system would route the video call to the consumer communication application provider, which would then route the video call to the end-user. In the case that the second provider is a UC&C provider, the UCCI or UCCI system would route the video call to a hyperscaler (or other infrastructure provider) that hosts software of the UC&C provider. The hyperscaler (or other infrastructure provider) that hosts the UC&C provider would then route the video call to the end-user. In the case that the second provider is a contact center software provider, the UCCI or UCCI system would route the video call to an IP-based switch that hosts the telephone number associated with or is tied to the contact center software provider. The IP-based switch that is tied to the contact center software provider would then route the video call to the end-user.

In examples, the consumer cloud video calling class of use cases includes cloud video calling from UC&C provider to consumer communication application provider, from contact center software provider to consumer communication application provider, from consumer communication application provider to UC&C provider, from consumer communication application provider to contact center software provider, and from consumer communication application provider to consumer communication application provider.

The consumer OTT services class of use cases provides for enabling OTT services between IP-based consumer telephone numbers. Unless providers and their customers (across separate administrative domains) are federated with each other, OTT services across providers are not possible. In examples, with the UCCI or UCCI system, the federated community of hyperscalers and communication services providers enable OTT services.

Calls from a first provider to a second provider often traverse the PSTN. When an outbound call is placed from the first provider to a telephone number in a separate administrative domain that is associated with the second provider if the provider of the telephone number to the consumer (i.e., the first provider) and the second provider (across separate administrative domains) are not federated over IP, the routing engine may leverage the PSTN to find where the telephone number resides. Should the number exist in a block that has had a single number ported, the LNP is queried. For blocks that have not had a number ported, the LERG is queried. The LNP or LERG identifies the carrier LRN then routes the call to the appropriate carrier which then routes the call to the receiving customer. Should this occur, OTT services cannot be used as the PSTN does not support OTT services.

In examples, IP-based telephone numbers tied to the first provider and the second provider should be able to offer OTT services, regardless of the first provider or the second provider that a user of the consumer telephone number uses, by using the UCCI or UCCI system. With the UCCI or UCCI system, any number that is loaded into the UCCI database would remain on IP networks, thus avoiding the PSTN. In some examples, the UCCI or UCCI system would also enable live interactions between the first provider and the second provider as it would federate the first providers and their consumer customers (across separate administrative domains) with the second providers and their consumer customers (across separate administrative domains). In examples, a user of the first provider with a first telephone number places a call or a video call to a second telephone number associated with the second provider. The call or video call would route from the first provider to the UCCI or UCCI system. The UCCI or UCCI system would then query its database for the IP-based LRN. The UCCI or UCCI system would then route the call to the second provider. In some examples, a telephone call or a video call may be initiated as described above with respect to cloud calling or cloud video calling. Once the call connection has been established, users on either end of the call may instantiate or use OTT services.

In some examples, the first provider includes at least one of a consumer communication application provider, a UC&C provider or a contact center software provider, and/or the like. In the case that the first provider is a consumer communication application provider, the call or video call would route from the first provider to the UCCI or UCCI system. In the case that the first provider is a UC&C provider, the call or video call would route from a hyperscaler (or other infrastructure provider) that the UC&C provider is hosted on to the UCCI or UCCI system. In the case that the first provider is a contact center software provider, the call or video call would route from an IP-based switch that hosts a telephone number associated with or tied to the contact center software provider to the UCCI or UCCI system. Whether the first provider is a consumer communication application provider, a UC&C provider, or a contact center software provider, the OTT services may include live collaboration tools associated with the video or audio call, informative video shared via screen share, and/or the like.

In some examples, the second provider includes at least one of a consumer communication application provider, a UC&C provider, or a contact center software provider, and/or the like. In the case that the second provider is a consumer communication application provider, the UCCI or UCCI system would route the call or video call to the consumer communication application provider, which would then route the call or video call to the end-user. In the case that the second provider is a UC&C provider, the UCCI or UCCI system would route the call or video call to a hyperscaler (or other infrastructure provider) that hosts software of the UC&C provider. The hyperscaler (or other infrastructure provider) that hosts the UC&C provider would then route the call or video call to the end-user. In the case that the second provider is a contact center software provider, the UCCI or UCCI system would route the call or video call to an IP-based switch that hosts the telephone number associated with or is tied to the contact center software provider. The IP-based switch that is tied to the contact center software provider would then route the call or video call to the end-user. Whether the second provider is a consumer communication application provider, a UC&C provider, or a contact center software provider, the OTT services may include live collaboration tools associated with the video or audio call, informative video shared via screen share, and/or the like.

In examples, the consumer OTT services class of use cases includes cloud calling or cloud video calling from UC&C provider to consumer communication application provider, from contact center software provider to consumer communication application provider, from consumer communication application provider to UC&C provider, from consumer communication application provider to contact center software provider, and from consumer communication application provider to consumer communication application provider.

Figure 3:
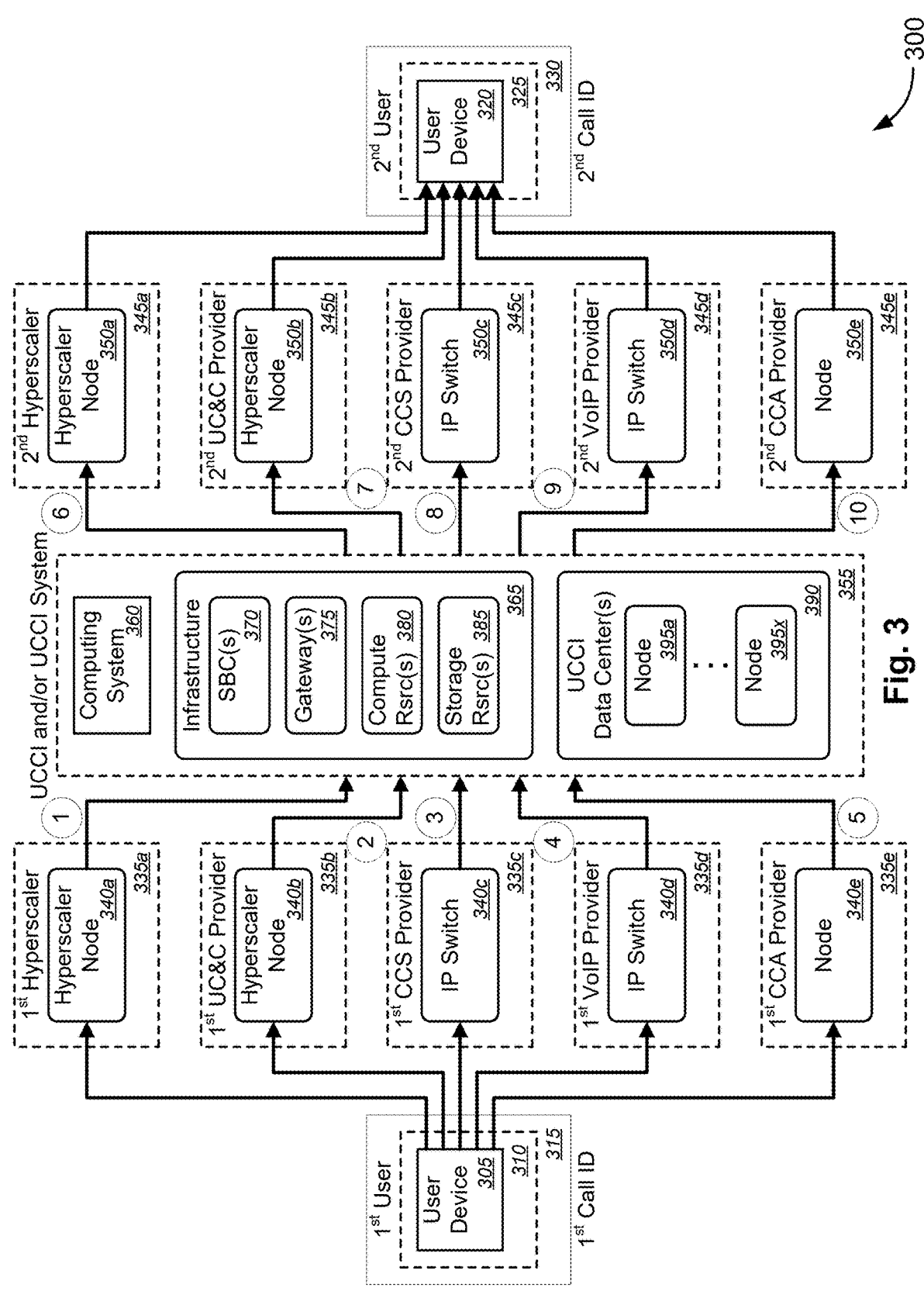
FIG. 3 depicts an example set of sequence flows illustrating various combinations of communication service providers between which cloud-based voice calling service, video calling service, and/or OTT services may be implemented, in accordance with various embodiments.

FIG. 3 depicts an example set of sequence flows 300 illustrating various combinations of communication service providers between which cloud-based voice calling service, video calling service, and/or OTT services may be implemented, in accordance with various embodiments.

In the non-limiting example 300 of FIG. 3, in the case that a call connection is established between user devices 305 and 320 via UCCI and/or UCCI system 355, such call connection is established via a first communication service provider 335 and a second communication service provider 345. In examples, the first communication service provider 335 operates or manages a first set of cloud-based data centers (similar to first participant data center(s) 112 of FIG. 1, or the like) and the first administrative domain (similar to first administrative domain 108 of FIG. 1, or the like) is hosted on the first set of cloud-based data centers. In some cases, the second communication service provider 345 operates or manages a second set of cloud-based data centers (similar to second participant data center(s) 126 of FIG. 1, or the like) and the second administrative domain (similar to second administrative domain 122 of FIG. 1, or the like) is hosted on the second set of cloud-based data centers. The UCCI 355 is operated or managed by a UCCI provider using a UCCI system (similar to UCCI system 130 of FIG. 1, or the like). In some examples, the UCCI system includes at least one of one or more UCCI gateway devices 375, a plurality of optical connections (similar to connections 150 of FIG. 1, or the like) between each set of cloud-based data center (similar to participant data centers 112 and 126, or the like) and the one or more UCCI gateway devices 375 (similar to gateway devices 140, or the like), or one or more UCCI SBCs 370 (similar to UCCI SBCs 142 and 152, or the like) each disposed at a UCCI data center among one or more UCCI data centers, and/or the like. In some instances, the UCCI system 355 further includes at least one of an orchestrator or computing system 360, a plurality of compute resources 380, a plurality of data storage resources 385, or other infrastructure components (including one or more routers, one or more switches, or one or more firewalls, and/or the like), and/or the like.

In examples, the first communication service provider 335 includes at least one of a first communication service infrastructure provider (or hyperscaler) 335*a*, a first unified communications and collaboration ("UC&C") provider 335*b*, a first contact center software ("CCS") provider 335*c*, a first voice over Internet protocol ("VoIP") provider 335*d*, or a first consumer communication application ("CCA") provider 335*e*, and/or the like. The second communication service provider 345 includes at least one of a second communication service infrastructure provider (or hyperscaler) 345*a*, a second UC&C provider 345*b*, a second CCS provider 345*c*, a second VOIP provider 345*d*, or a second CCA provider 345*c*, and/or the like. In some examples, first and second hyperscalers 335*a* and 345*a* include hyperscaler nodes 340*a* and 350*a*, respectively. In examples, first and second UC&C providers 335*b* and 345*b* are hosted on hyperscaler nodes 340*b* and 350*b*, respectively. In some cases, the hyperscaler nodes 340*b* and 350*b* may be similar, if not identical, to hyperscaler nodes 340*a* and 350*a*. In some examples, first and second CCS providers 335*c* and 345*c* are tied to IP switches 340*c* and 350*c*, respectively. In examples, first and second VOIP providers 335*d* and 345*d* are tied to IP switches 340*d* and 350*d*, respectively. In some examples, first and second CCA providers 335*e* and 345*e* include nodes 340*e* and 350*e*, respectively.

In some embodiments, establishing a cloud-based call connection includes routing a cloud-based call between the user devices 305 and 320. In examples, routing the cloud-based call includes one of routing a cloud-based voice (or audio-only) call or routing a cloud-based video call. In an example, establishing the cloud-based call connection includes routing the cloud-based call from user device 305, which is associated with first user 310 and associated with first call ID 315, to hyperscaler node 340*a* of the first hyperscaler 335*a*; routing from the hyperscaler node 340*a* to a first node (e.g., one of nodes 395*a*-395*x*) of UCCI and/or UCCI system 355 (as depicted in FIG. 3 by arrow denoted "1"); routing from the first node of UCCI and/or UCCI system 355 to one of hyperscaler node 350*a* of the second hyperscaler 345*a* (as depicted in FIG. 3 by arrow denoted "6"), hyperscaler node 350*b* on which the second UC&C provider 345*b* is hosted (as depicted in FIG. 3 by arrow denoted "7"), IP switch 350*c* that is tied to the second CCS provider 345*c* (as depicted in FIG. 3 by arrow denoted "8"), IP switch 350*d* that is tied to at least one of the second VoIP provider 345*d* or the VoIP telephone number associated with the second call ID 330 (as depicted in FIG. 3 by arrow denoted "9"), or node 350*e* of the second CCA provider 345*e* (as depicted in FIG. 3 by arrow denoted "10"), and/or the like; and routing from the one of the hyperscaler node 350*a*, the hyperscaler node 350*b*, the IP switch 350*c*, or the node 350*e*, and/or the like, to user device 320, which is associated with second user 325 and associated with second call ID 330. In such cases, the second user 325 associated with the second call ID 330 includes one of an employee of the second hyperscaler 345*a*, a customer of the second hyperscaler 345*a*, or a user leveraging infrastructure of the second hyperscaler 345*a*, and/or the like.

In another example, establishing the cloud-based call connection includes routing the cloud-based call from user device 305, which is associated with first user 310 and associated with first call ID 315, to hyperscaler node 340*b* on which the first UC&C provider 335*b* is hosted; routing from the hyperscaler node 340*b* to a second node (e.g., one of nodes 395*a*-395*x*) of UCCI and/or UCCI system 355 (as depicted in FIG. 3 by arrow denoted "2"); routing from the second node of UCCI and/or UCCI system 355 to one of hyperscaler node 350*a* of the second hyperscaler 345*a* (as depicted in FIG. 3 by arrow denoted "6"), hyperscaler node 350*b* on which the second UC&C provider 345*b* is hosted (as depicted in FIG. 3 by arrow denoted "7"), IP switch 350*c* that is tied to the second CCS provider 345*c* (as depicted in FIG. 3 by arrow denoted "8"), IP switch 350*d* that is tied to at least one of the second VOIP provider 345*d* or the VoIP telephone number associated with the second call ID 330 (as depicted in FIG. 3 by arrow denoted "9"), or node 350*c* of the second CCA provider 345*e* (as depicted in FIG. 3 by arrow denoted "10"), and/or the like; and routing from the one of the hyperscaler node 350*a*, the hyperscaler node 350*b*, the IP switch 350*c*, the IP switch 350*d*, or the node 350*e*, and/or the like, to user device 320, which is associated with second user 325 and associated with second call ID 330.

In yet another example, establishing the cloud-based call connection includes routing the cloud-based call from user device 305, which is associated with first user 310 and associated with first call ID 315, to IP switch 340*c* that is tied to the first CCS provider 335*c*; routing from the IP switch 340*c* to a third node (e.g., one of nodes 395*a*-395*x*) of UCCI and/or UCCI system 355 (as depicted in FIG. 3 by arrow denoted "3"); routing from the third node of UCCI and/or UCCI system 355 to one of hyperscaler node 350*a* of the second hyperscaler 345*a* (as depicted in FIG. 3 by arrow denoted "6"), hyperscaler node 350*b* on which the second UC&C provider 345*b* is hosted (as depicted in FIG. 3 by arrow denoted "7"), IP switch 350*c* that is tied to the second CCS provider 345*c* (as depicted in FIG. 3 by arrow denoted "8"), IP switch 350*d* that is tied to at least one of the second VoIP provider 345*d* or the VoIP telephone number associated with the second call ID 330 (as depicted in FIG. 3 by arrow denoted "9"), or node 350*e* of the second CCA provider 345*e* (as depicted in FIG. 3 by arrow denoted "10"), and/or the like; and routing from the one of the hyperscaler node 350*a*, the hyperscaler node 350*b*, the IP switch 350*c*, the IP switch 350*d*, or the node 350*e*, and/or the like, to user device 320, which is associated with second user 325 and associated with second call ID 330.

In still another example, establishing the cloud-based call connection includes routing the cloud-based call from user device 305, which is associated with first user 310 and associated with first call ID 315, to IP switch 340*d* that is tied to at least one of the first VoIP provider 335*d* or a VoIP telephone number associated with the first call ID 315; routing from the IP switch 340*d* to a fourth node (e.g., one of nodes 395*a*-395*x*) of UCCI and/or UCCI system 355 (as depicted in FIG. 3 by arrow denoted "4"); routing from the fourth node of UCCI and/or UCCI system 355 to one of hyperscaler node 350*a* of the second hyperscaler 345*a* (as depicted in FIG. 3 by arrow denoted "6"), hyperscaler node 350*b* on which the second UC&C provider 345*b* is hosted (as depicted in FIG. 3 by arrow denoted "7"), IP switch 350*c* that is tied to the second CCS provider 345*c* (as depicted in FIG. 3 by arrow denoted "8"), IP switch 350*d* that is tied to at least one of the second VoIP provider 345*d* or the VoIP telephone number associated with the second call ID 330 (as depicted in FIG. 3 by arrow denoted "9"), or node 350*e* of the second CCA provider 345*e* (as depicted in FIG. 3 by arrow denoted "10"), and/or the like; and routing from the one of the hyperscaler node 350*a*, the hyperscaler node 350*b*, the IP switch 350*c*, the IP switch 350*d*, or the node 350*e*, and/or the like, to user device 320, which is associated with second user 325 and associated with second call ID 330.

In another example, establishing the cloud-based call connection includes routing the cloud-based call from user device 305, which is associated with first user 310 and associated with first call ID 315, to node 340*e* of the first CCA provider 335*e*; routing from the node 340*e* to a fifth node (e.g., one of nodes 395*a*-395*x*) of UCCI and/or UCCI system 355 (as depicted in FIG. 3 by arrow denoted "5"); routing from the fifth node of UCCI and/or UCCI system 355 to one of hyperscaler node 350*a* of the second hyperscaler 345*a* (as depicted in FIG. 3 by arrow denoted "6"), hyperscaler node 350*b* on which the second UC&C provider 345*b* is hosted (as depicted in FIG. 3 by arrow denoted "7"), IP switch 350*c* that is tied to the second CCS provider 345*c* (as depicted in FIG. 3 by arrow denoted "8"), IP switch 350*d* that is tied to at least one of the second VOIP provider 345*d* or the VoIP telephone number associated with the second call ID 330 (as depicted in FIG. 3 by arrow denoted "9"), or node 350*e* of the second CCA provider 345*e* (as depicted in FIG. 3 by arrow denoted "10"), and/or the like; and routing from the one of the hyperscaler node 350*a*, the hyperscaler node 350*b*, the IP switch 350*c*, the IP switch 350*d*, or the node 350*e*, and/or the like, to user device 320, which is associated with second user 325 and associated with second call ID 330.

FIGS. 4A-4D (collectively, "FIG. 4") depict flow diagrams illustrating an example method 400 for implementing cloud-based voice calling service, video calling service, and/or OTT services, in accordance with various embodiments.

Figure 4A:
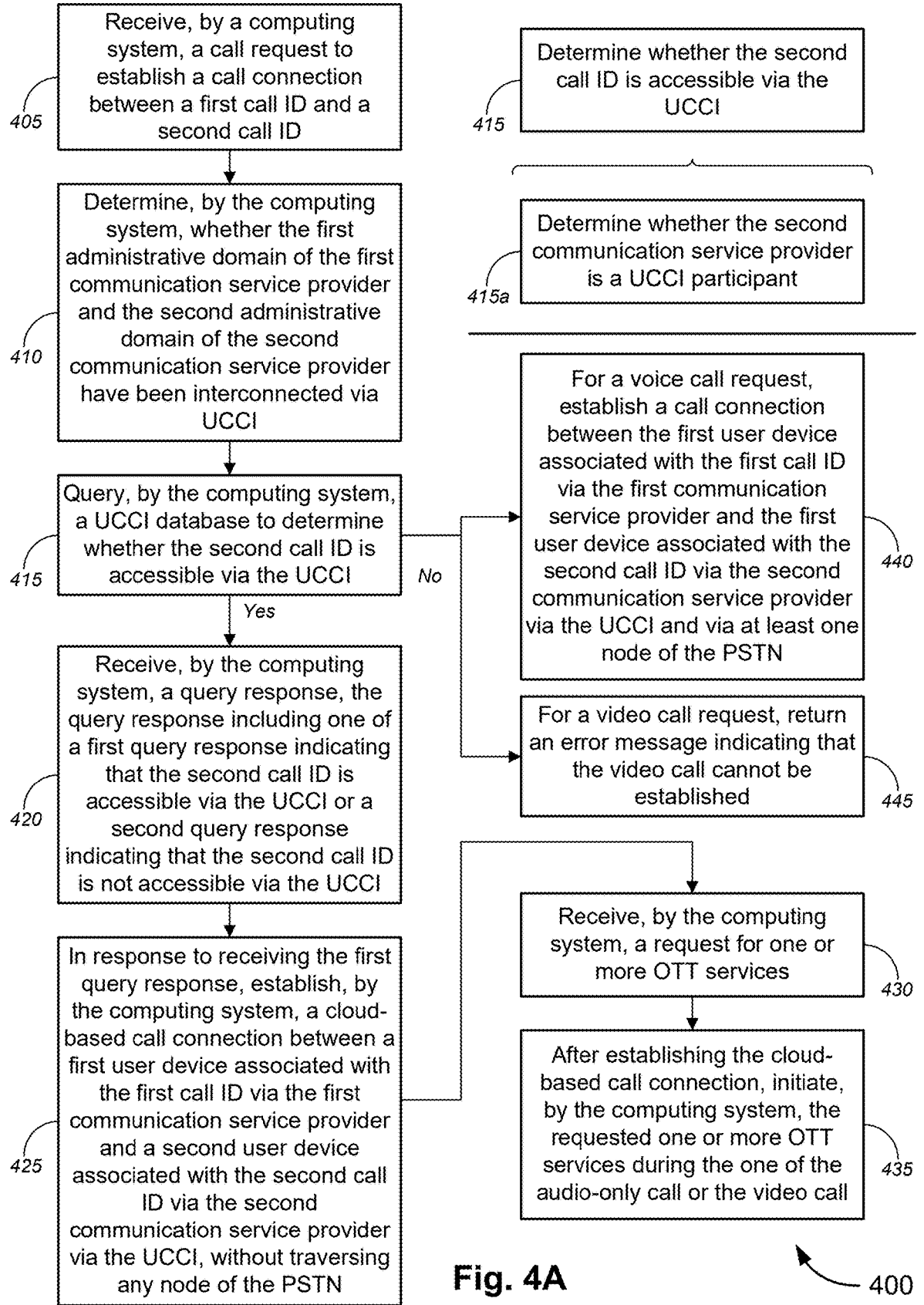

In the non-limiting embodiment of FIG. 4A, method 400, at operation 405, may include receiving, by a computing system, a call request to establish a call connection between a first call ID and a second call ID. The first call ID is associated with a first user and is associated with a first communication service provider, while the second call ID is associated with a second user and is associated with a second communication service provider. A first administrative domain of the first communication service provider is separate from a second administrative domain of the second communication service provider. Herein, any call connection that is established in response to the call request would functionally be a call between a user device associated with the first call ID and another user device associated with the second call ID. For cloud-based calling, a call ID may be associated with at least one of (a) different devices, (b) calling software applications ("apps") installed on different devices, or (c) web-based applications accessible via a browser on any user device, and/or the like. In such cases, a user can call or receive a call on a mobile phone at one time, then at a different time call or receive a call on a web-based call user interface ("UI") on a browser running on a laptop computer, then at yet another time call or receive a call on a calling app installed on a tablet computer, and so on. In examples, hand-offs may be made between the different devices via the calling app during a single call (e.g., starting a call on a smart phone, then switching mid-call to a tablet computer, then switching mid-call to the calling app running on a smart TV, etc.). In some cases, for OTT services as described herein, a cloud-based voice or video call may be established via a calling app installed on a mobile phone (e.g., smart phone), while the OTT service (e.g., a video game or AR/VR/MR game, or screensharing, etc.) may be instantiated, and may be concurrently executed, via the calling app running on a laptop, tablet, or gaming console/AR/VR/MR headset, or the like.

At operation 410, method 400 further includes determining, by the computing system, whether the first administrative domain of the first communication service provider and the second administrative domain of the second communication service provider have been interconnected via a UCCI, which is a cloud-based interconnection. At operation 415, method 400 includes, based on a determination that the first administrative domain of the first communication service provider and the second administrative domain of the second communication service provider have been interconnected via the UCCI, querying, by the computing system, a UCCI database to determine whether the second call ID is accessible via the UCCI. If so, method 400 may continue onto the process at block 420. If not, method 400 either may continue onto the process at block 440 or may continue onto the process at block 445.

According to some embodiments, the UCCI establishes a federated community of communication service providers by interconnecting a plurality of administrative domains corresponding to a plurality of communication service providers, with each communication service provider among the plurality of communication service provider being a participant of the UCCI. In examples, determining whether the second call ID is accessible via the UCCI (at operation 415) may include determining whether the second communication service provider is a UCCI participant (at operation 415*a*).

Method 400 further includes, at operation 420, receiving, by the computing system, a query response, the query response including one of a first query response indicating that the second call ID is accessible via the UCCI or a second query response indicating that the second call ID is not accessible via the UCCI. At operation 425, method 400 further includes, in response to receiving the first query response indicating that the second call ID is accessible via the UCCI, establishing, by the computing system, a cloud-based call connection between a first user device associated with the first call ID via the first administrative domain of the first communication service provider and a second user device associated with the second call ID via the second administrative domain of the second communication service provider via the UCCI, without traversing any node of the PSTN.

In some embodiments, establishing the cloud-based call connection includes establishing one of an audio-only call or a video call. Method 400 further includes receiving, by the computing system, a request for one or more OTT services (at operation 430); and, after establishing the cloud-based call connection, initiating, by the computing system, the requested one or more OTT services during the one of the audio-only call or the video call (at operation 435). In examples, the one or more OTT services may each include, without limitation, at least one of a multiplayer screen-based video game playable during the one of the cloud-based audio-only call connection or the cloud-based video call connection, a multiplayer augmented reality ("AR") video game playable during the one of the cloud-based audio-only call connection or the cloud-based video call connection, a multiplayer virtual reality ("VR") video game playable during the one of the cloud-based audio-only call connection or the cloud-based video call connection, a multiplayer mixed reality ("MR") video game playable during the one of the cloud-based audio-only call connection or the cloud-based video call connection, screensharing during the one of the cloud-based audio-only call connection or the cloud-based video call connection, or live artificial intelligence ("AI")-generated multi-model content playable during the one of the cloud-based audio-only call connection or the cloud-based video call connection, and/or the like.

In response to receiving a query response indicating that the second call ID is not accessible via the UCCI (following the process at operation 415), method 400 includes one of: for a voice call request, establishing a call connection between the first user device associated with the first call ID via the first administrative domain of the first communication service provider and the second user device associated with the second call ID via the second administrative domain of the second communication service provider via the UCCI and via at least one node of the PSTN (at operation 440); or for a video call request, returning an error message indicating that the video call cannot be established because the PSTN does not support video calls (at operation 445).

In examples, the computing system is a computing system of the UCCI, and the cloud-based call connection includes one of an audio-only call connection or a video call connection. Referring to the non-limiting example of FIG. 4B, establishing the cloud-based call connection (at operation 425) includes routing, by the computing system, the call request from the first communication service provider to the UCCI (at operation 450); querying, by the computing system, the UCCI database for an IP-based local routing number ("LRN") associated with the second call ID (at operation 455); receiving the IP-based LRN (at operation 460); and in response to receiving the IP-based LRN, routing, by the computing system, the call request to the second administrative domain of the second communication service provider (at operation 465), and establishing, by the computing system, the cloud-based call connection between the first call ID and the IP-based LRN via the UCCI, without traversing the PSTN (at operation 470).

In examples, the first communication service provider and the second communication service provider each includes at least one of a communication service infrastructure provider (or hyperscaler), a unified communications and collaboration ("UC&C") provider, a contact center software provider, a voice over Internet protocol ("VoIP") provider, or a consumer communication application provider, and/or the like. Turning to the non-limiting example of FIG. 4C, establishing the cloud-based call connection (at operation 425) includes routing a cloud-based call from the first communication service provider (at operation 475) by performing one of: routing the cloud-based call from a first communication service infrastructure provider to a first node of the UCCI (at operation 475a); routing the cloud-based call from a node of a first infrastructure provider on which a first UC&C provider is hosted to a second node of the UCCI (at operation 475b); routing the cloud-based call from an IP switch that is tied to a first contact center software provider to a third node of the UCCI (at operation 475c); routing the cloud-based call from an IP switch that is tied to at least one of a first VOIP provider or a VoIP telephone number associated with the first call ID to a fourth node of the UCCI (at operation 475d); or routing the cloud-based call from a first consumer communication application provider to a fifth node of the UCCI (at operation 475c); and/or the like.

In some examples, with reference to FIG. 4D, establishing the cloud-based call connection (at operation 425) further includes routing the cloud-based call to the second communication service provider (at operation 480) by performing one of: routing the cloud-based call from a sixth node of the UCCI to a second communication service infrastructure provider, the second communication service infrastructure provider subsequently routing the cloud-based call to the second call ID (at operation 480a), wherein the second user associated with the second call ID includes one of an employee of the second communication service infrastructure provider, a customer of the second communication service infrastructure provider, or a user leveraging infrastructure of the second communication service infrastructure provider; routing the cloud-based call from a seventh node of the UCCI to a node of a second infrastructure provider on which a second UC&C provider is hosted, the second infrastructure provider subsequently routing the cloud-based call to the second call ID (at operation 480b); routing the cloud-based call from a eighth node of the UCCI to an IP switch that is tied to a second contact center software provider, said IP switch subsequently routing the cloud-based call to the second call ID (at operation 480c); routing the cloud-based call from a ninth node of the UCCI to an IP switch that is tied to at least one of a second VoIP provider or the VoIP telephone number associated with the second call ID, said IP switch subsequently routing the cloud-based call to the VoIP telephone number (at operation 480d); or routing the cloud-based call from a tenth node of the UCCI to a second consumer communication application provider, the second consumer communication application provider subsequently routing the cloud-based call to the second call ID (at operation 480c); and/or the like. In examples, as described above with reference to FIG. 3, establishing the cloud-based call connection (at operation 425) includes any combination of one of the routing at operations 475a-475c and one of the routing at operations 480a-480c.

FIG. 5 depicts flow diagrams illustrating another example method 500 for implementing cloud-based voice calling service, video calling service, and/or OTT services, in accordance with various embodiments.

In the non-limiting embodiment of FIG. 5, method 500, at operation 505, may include receiving, by a computing system, a communication service request to initiate a communication service. In examples, the communication service includes one of an audio-only call, a video call, or an OTT service, and/or the like, during the audio-only call or the video call between a first call ID and a second call ID. The first call ID is associated with a first user and is associated with a first communication service provider. The second call ID is associated with a second user and is associated with a second communication service provider. A first administrative domain of the first communication service provider is separate from a second administrative domain of the second communication service provider. At operation 510, method 500 further includes querying, by the computing system, a UCCI database to determine whether the second call ID is accessible via the UCCI. Method 500 further includes, at operation 515, receiving, by the computing system, a query response. In examples, the query response includes one of a first query response indicating that the second call ID is accessible via the UCCI or a second query response indicating that the second call ID is not accessible via the UCCI. At operation 520, method 500 includes, in response to receiving the first query response indicating that the second call ID is accessible via the UCCI, initiating, by the computing system, a cloud-based communication service over the UCCI, without traversing the PSTN.

In some examples, determining whether the second call ID is accessible via the UCCI (at operation 510) includes at least one of: determining, by the computing system, whether the first administrative domain of the first communication service provider and the second administrative domain of the second communication service provider have been inter-connected via UCCI (at operation 525); or determining, by the computing system, whether both the first communication service provider and the second communication service provider are UCCI participants among a federated commu-nity of communication service providers established by the UCCI (at operation 530).

In examples, initiating the cloud-based communication service over the UCCI, without traversing the PSTN, (at operation 520) includes performing, by the computing sys-tem, a corresponding one of: establishing a cloud-based audio-only call connection between the first call ID via the first administrative domain of the first communication ser-vice provider and the second call ID via the second admin-istrative domain of the second communication service pro-vider via the UCCI, without traversing any node of the PSTN (at operation 535); establishing a cloud-based video call connection between the first call ID via the first admin-istrative domain of the first communication service provider and the second call ID via the second administrative domain of the second communication service provider via the UCCI (at operation 540); or initiating OTT services over one of the cloud-based audio-only call connection or the cloud-based video call connection (at operation 545); and/or the like.

In some examples, the OTT services include at least one of a multiplayer screen-based video game playable during the one of the cloud-based audio-only call connection or the cloud-based video call connection, a multiplayer AR video game playable during the one of the cloud-based audio-only call connection or the cloud-based video call connection, a multiplayer VR video game playable during the one of the cloud-based audio-only call connection or the cloud-based video call connection, a multiplayer MR video game play-able during the one of the cloud-based audio-only call connection or the cloud-based video call connection, screen-sharing during the one of the cloud-based audio-only call connection or the cloud-based video call connection, or live AI-generated multi-model content playable during the one of the cloud-based audio-only call connection or the cloud-based video call connection, and/or the like.

While the techniques and procedures in methods 400, 500 are depicted and/or described in a certain order for purposes of illustration, it should be appreciated that certain proce-dures may be reordered and/or omitted within the scope of various embodiments. Moreover, while the methods 400, 500 may be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or soft-ware) implementation. Similarly, while each of the systems, examples, or embodiments 100, 200, and 300 of FIGS. 1, 2, and 3, respectively (or components thereof), can operate according to the methods 400, 500 (e.g., by executing instructions embodied on a computer readable medium), the systems, examples, or embodiments 100, 200, and 300 of FIGS. 1, 2, and 3 can each also operate according to other modes of operation and/or perform other suitable proce-dures.

Exemplary System and Hardware Implementation

Figure 6:
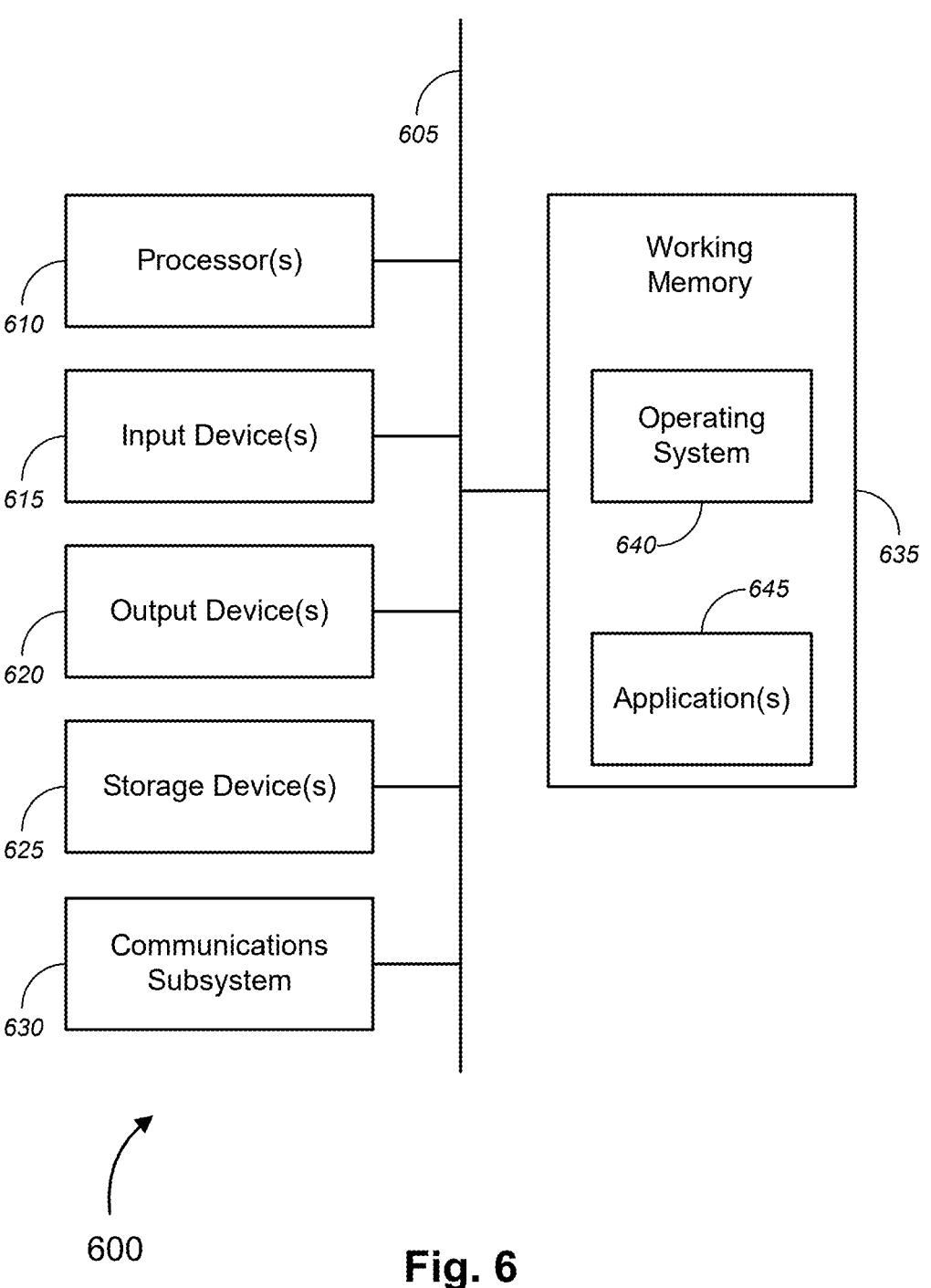
FIG. 6 depicts a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of com-puter or hardware system (i.e., calling devices 102 and 202, called devices 116 and 208, user devices 305 and 320, computing system or orchestrator 134, 236, and 360, gate-way devices 140 and 375, etc.), as described above. It should be noted that FIG. 6 is meant only to provide a generalized illustration of various components, of which one or more (or none) of each may be utilized as appropriate. FIG. 6, therefore, broadly illustrates how individual system ele-ments may be implemented in a relatively separated or relatively more integrated manner.

The computer or hardware system 600—which might represent an embodiment of the computer or hardware system (i.e., calling devices 102 and 202, called devices 116 and 208, user devices 305 and 320, computing system or orchestrator 134, 236, and 360, gateway devices 140 and 375, etc.), described above with respect to FIGS. 1-5—is shown including hardware elements that can be electrically coupled via a bus 605 (or may otherwise be in communi-cation, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, with-out limitation, a modem, a network card (wireless or wired), an infra-red communication device, a wireless communica-tion device and/or chipset (such as a Bluetooth™ device, an 802.11 device, a Wi-Fi device, a WiMAX device, a wireless wide area network ("WWAN") device, cellular communi-cation facilities, etc.), and/or the like. The communications subsystem 630 may permit data to be exchanged with a network (such as the network described below, to name one example), with other computer or hardware systems, and/or with any other devices described herein. In many embodi-ments, the computer or hardware system 600 will further include a working memory 635, which can include a RAM or ROM device, as described above.

The computer or hardware system 600 also may include software elements, shown as being currently located within the working memory 635, including an operating system 640, device drivers, executable libraries, and/or other code, such as one or more application programs 645, which may include computer programs provided by various embodi-ments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that include the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for case of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, by a computing system, a call request to establish a call connection between a first call identifier ("ID") and a second call ID, the first call ID being associated with a first user and being associated with a first communication service provider, the second call ID being associated with a second user and being associated with a second communication service provider, a first administrative domain of the first communication service provider being separate from a second administrative domain of the second communication service provider;

determining, by the computing system, whether the first administrative domain of the first communication service provider and the second administrative domain of the second communication service provider have been interconnected via a unified communications and collaboration interconnection ("UCCI"), wherein the UCCI is a cloud-based interconnection;

based on a determination that the first administrative domain of the first communication service provider and the second administrative domain of the second communication service provider have been interconnected via the UCCI, querying, by the computing system, a UCCI database to determine whether the second call ID is accessible via the UCCI; and receiving, by the computing system, a query response, the query response including one of a first query response indicating that the second call ID is accessible via the UCCI or a second query response indicating that the second call ID is not accessible via the 21 UCCI;

wherein in response to receiving the first query response indicating that the second call ID is accessible via the UCCI, establishing, by the computing system, a cloud-based call connection between a first user device associated with the first call ID via the first administrative domain of the first communication service provider and a second user device associated with the second call ID via the second administrative domain of the second communication service provider via the UCCI, without traversing any node of a public switched telephone network ("PSTN").

2. The method of claim 1, wherein the first communication service provider operates or manages a first set of cloud-based data centers and the first administrative domain is hosted on the first set of cloud-based data centers, wherein the second communication service provider operates or manages a second set of cloud-based data centers and the second administrative domain is hosted on the second set of cloud-based data centers, wherein the UCCI is operated or managed by a UCCI provider using a UCCI system, wherein the UCCI system includes at least one of one or more UCCI gateway devices, a plurality of optical connections between each set of cloud-based data center and the one or more UCCI gateway devices, or one or more UCCI session border controllers ("SBCs") each disposed at a UCCI data center among one or more UCCI data centers.

3. The method of claim 2, wherein the UCCI system further includes at least one of an orchestrator, a plurality of compute resources, a plurality of data storage resources, one or more routers, one or more switches, or one or more firewalls.

4. The method of claim 1, wherein the UCCI establishes a federated community of communication service providers by interconnecting a plurality of administrative domains corresponding to a plurality of communication service providers, with each communication service provider among the plurality of communication service provider being a participant of the UCCI, wherein determining whether the second call ID is accessible via the UCCI comprises determining whether the second communication service provider is a UCCI participant.

5. The method of claim 1, wherein the UCCI is a layer three network interconnection that is established over layer two network connections of nodes within a corresponding administrative domain of each of the first communication service provider or the second communication service provider.

6. The method of claim 1, wherein the computing system is a computing system of the UCCI, wherein the cloud-based call connection comprises one of an audio-only call connection or a video call connection, wherein establishing the cloud-based call connection comprises:

routing, by the computing system, the call request from the first communication service provider to the UCCI;

querying, by the computing system, the UCCI database for an IP-based local routing number ("LRN") associated with the second call ID; and in response to receiving the IP-based LRN, routing, by the computing system, the call request to the second administrative domain of the second communication service provider, and establishing, by the computing system, the cloud-based call connection between the first call ID and the IP-based LRN via the UCCI, without traversing the PSTN.

7. The method of claim 1, wherein the first communication service provider and the second communication service provider each comprises at least one of a communication service infrastructure provider, a unified communications and collaboration ("UC&C") provider, a contact center software provider, a voice over Internet protocol ("VoIP") provider, or a consumer communication application provider.

8. The method of claim 7, wherein establishing the cloud-based call connection comprises routing a cloud-based call from the first communication service provider by performing one of:

routing the cloud-based call from a first communication service infrastructure provider to a first node of the UCCI;

routing the cloud-based call from a node of a first infrastructure provider on which a first UC&C provider is hosted to a second node of the UCCI;

routing the cloud-based call from an IP switch that is tied to a first contact center software provider to a third node of the UCCI;

routing the cloud-based call from an IP switch that is tied to at least one of a first VOIP provider or a VoIP telephone number associated with the first call ID to a fourth node of the UCCI; or routing the cloud-based call from a first consumer communication application provider to a fifth node of the UCCI.

9. The method of claim 8, wherein establishing the cloud-based call connection further comprises routing the cloud-based call to the second communication service provider by performing one of:

routing the cloud-based call from a sixth node of the UCCI to a second communication service infrastructure provider, the second communication service infrastructure provider subsequently routing the cloud-based call to the second call ID, wherein the second user associated with the second call ID includes one of an employee of the second communication service infrastructure provider, a customer of the second communication service infrastructure provider, or a user leveraging infrastructure of the second communication service infrastructure provider;

routing the cloud-based call from a seventh node of the UCCI to a node of a second infrastructure provider on which a second UC&C provider is hosted, the second infrastructure provider subsequently routing the cloud-based call to the second call ID;

routing the cloud-based call from a eighth node of the UCCI to an IP switch that is tied to a second contact center software provider, said IP switch subsequently routing the cloud-based call to the second call ID;

routing the cloud-based call from a ninth node of the UCCI to an IP switch that is tied to at least one of a second VoIP provider or the VoIP telephone number associated with the second call ID, said IP switch subsequently routing the cloud-based call to the VoIP telephone number; or routing the cloud-based call from a tenth node of the UCCI to a second consumer communication application provider, the second consumer communication application provider subsequently routing the cloud-based call to the second call ID.

10. The method of claim 1, wherein establishing the cloud-based call connection comprises establishing one of an audio-only call or a video call, wherein the method further comprises:

receiving, by the computing system, a request for one or more over-the-top ("OTT") services; and after establishing the cloud-based call connection, initiating, by the computing system, the requested one or more OTT services during the one of the audio-only call or the video call.

11. The method of claim 1, wherein, in response to receiving a query response indicating that the second call ID is not accessible via the UCCI, performing one of:

for a voice call request, establishing a call connection between the first call ID via the first administrative domain of the first communication service provider and the second call ID via the second administrative domain of the second communication service provider via the UCCI and via at least one node of the PSTN; or for a video call request, returning an error message indicating that the video call cannot be established because the PSTN does not support video calls.

12. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive a call request to establish a call connection between a first call identifier ("ID") and a second call ID, the first call ID being associated with a first user and being associated with a first communication service provider, the second call ID is associated with a second user and being associated with a second communication service provider, a first administrative domain of the first communication service provider being separate from a second administrative domain of the second communication service provider;

determine whether the first administrative domain of the first communication service provider and the second administrative domain of the second communication service provider have been interconnected via a unified communications and collaboration interconnection ("UCCI"), wherein the UCCI is a cloud-based interconnection;

based on a determination that the first administrative domain of the first communication service provider and the second administrative domain of the second communication service provider have been interconnected via the UCCI, query a UCCI database to determine whether the second call ID is accessible via the UCCI; and receive a query response, the query response including one of a first query response indicating that the second call ID is accessible via the UCCI or a second query response indicating that the second call ID is not accessible via the UCCI;

wherein in response to receiving the first query response indicating that the second call ID is accessible via the UCCI, establishing a cloud-based call connection between a first user device associated with the first call ID via the first administrative domain of the first communication service provider and a second user device associated with the second call ID via the second administrative domain of the second communication service provider via the UCCI, without traversing any node of a public switched telephone network ("PSTN").

13. The system of claim 12, wherein the computing system comprises at least one of a system orchestrator, a server, a cloud computing system, or a distributed computing system.

14. The system of claim 12, wherein the cloud-based call connection comprises one of an audio-only call connection or a video call connection, wherein establishing the cloud-based call connection comprises:

routing the call request from the first communication service provider to the UCCI;

querying the UCCI database for an IP-based local routing number ("LRN") associated with the second call ID; and in response to receiving the IP-based LRN, routing the call request to the second administrative domain of the second communication service provider, and establishing the cloud-based call connection between the first call ID and the IP-based LRN via the UCCI, without traversing the PSTN.

15. The system of claim 12, wherein establishing the cloud-based call connection comprises routing a cloud-based call from the first communication service provider by performing one of:

routing the cloud-based call from a first communication service infrastructure provider to a first node of the UCCI;

routing the cloud-based call from a node of a first infrastructure provider on which a first UC&C provider is hosted to a second node of the UCCI;

routing the cloud-based call from an IP switch that is tied to a first contact center software provider to a third node of the UCCI;

routing the cloud-based call from an IP switch that is tied to at least one of a first VOIP provider or a VoIP telephone number associated with the first call ID to a fourth node of the UCCI; or routing the cloud-based call from a first consumer communication application provider to a fifth node of the UCCI.

16. The system of claim 15, wherein establishing the cloud-based call connection further comprises routing the cloud-based call to the second communication service provider by performing one of:

routing the cloud-based call from the first node of the UCCI to a second communication service infrastructure provider, the second communication service infrastructure provider subsequently routing the cloud-based call to the second call ID, wherein the second user associated with the second call ID includes one of an employee of the second communication service infrastructure provider, a customer of the second communication service infrastructure provider, or a user leveraging infrastructure of the second communication service infrastructure provider;

routing the cloud-based call from the second node of the UCCI to a node of a second infrastructure provider on which a second UC&C provider is hosted, the second infrastructure provider subsequently routing the cloud-based call to the second call ID;

routing the cloud-based call from the third node of the UCCI to an IP switch that is tied to a second contact center software provider, said IP switch subsequently routing the cloud-based call to the second call ID;

routing the cloud-based call from the fourth node of the UCCI to an IP switch that is tied to at least one of a second VOIP provider or the VoIP telephone number associated with the second call ID, said IP switch subsequently routing the cloud-based call to the VoIP telephone number; or routing the cloud-based call from the fifth node of the UCCI to a second consumer communication application provider, the second consumer communication application provider subsequently routing the cloud-based call to the second call ID.

17. A method, comprising:

receiving, by a computing system, a communication service request to initiate a communication service, the communication service comprising one of an audio-only call, a video call, or an over-the-top ("OTT") service during the audio-only call or the video call between a first call identifier ("ID") and a second call ID, the first call ID being associated with a first user and being associated with a first communication service provider, the second call ID is associated with a second user and being associated with a second communication service provider, a first administrative domain of the first communication service provider being separate from a second administrative domain of the second communication service provider;

querying, by the computing system, a unified communications and collaboration interconnection ("UCCI") database to determine whether the second call ID is accessible via the UCCI; and receiving, by the computing system, a query response, the query response including one of a first query response indicating that the second call ID is accessible via the UCCI or a second query response indicating that the second call ID is not accessible via the UCCI;

wherein in response to receiving the first query response indicating that the second call ID is accessible via the UCCI, initiating, by the computing system, a cloud-based communication service over the UCCI, without traversing a public switched telephone network ("PSTN").

18. The method of claim 17, wherein determining whether the second call ID is accessible via the UCCI comprises at least one of:

determining, by the computing system, whether the first administrative domain of the first communication service provider and the second administrative domain of the second communication service provider have been interconnected via UCCI; or determining, by the computing system, whether both the first communication service provider and the second communication service provider are UCCI participants among a federated community of communication service providers established by the UCCI.

19. The method of claim 17, wherein initiating the cloud-based communication service over the UCCI, without traversing the PSTN, comprises performing, by the computing system, a corresponding one of:

establishing a cloud-based audio-only call connection between a first user device associated with the first call ID via the first administrative domain of the first communication service provider and a second user device associated with the second call ID via the second administrative domain of the second communication service provider via the UCCI, without traversing any node of the PSTN;

establishing a cloud-based video call connection between the first user device associated with the first call ID via the first administrative domain of the first communication service provider and the second user device associated with the second call ID via the second administrative domain of the second communication service provider via the UCCI; or initiating OTT services over one of the cloud-based audio-only call connection or the cloud-based video call connection.

20. The method of claim 19, wherein the OTT services comprise at least one of a multiplayer screen-based video game playable during the one of the cloud-based audio-only call connection or the cloud-based video call connection, a multiplayer augmented reality ("AR") video game playable during the one of the cloud-based audio-only call connection or the cloud-based video call connection, a multiplayer virtual reality ("VR") video game playable during the one of the cloud-based audio-only call connection or the cloud-based video call connection, a multiplayer mixed reality ("MR") video game playable during the one of the cloud-based audio-only call connection or the cloud-based video call connection, screensharing during the one of the cloud-based audio-only call connection or the cloud-based video call connection, or live artificial intelligence ("AI")-generated multi-model content playable during the one of the cloud-based audio-only call connection or the cloud-based video call connection.

* * * * *